United States Patent
Kasuya et al.

(10) Patent No.: US 11,108,964 B2
(45) Date of Patent: Aug. 31, 2021

(54) INFORMATION PROCESSING APPARATUS PRESENTING INFORMATION, INFORMATION PROCESSING METHOD, AND STORAGE MEDIUM

(71) Applicant: CANON KABUSHIKI KAISHA, Tokyo (JP)

(72) Inventors: Nozomu Kasuya, Yokohama (JP); Makoto Tomioka, Kawasaki (JP); Daisuke Kotake, Yokohama (JP); Masahiro Suzuki, Kawasaki (JP); Takayuki Yamada, Kawasaki (JP); Masakazu Fujiki, Kawasaki (JP); Akihiro Katayama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 61 days.

(21) Appl. No.: 16/734,831

(22) Filed: Jan. 6, 2020

(65) Prior Publication Data

US 2020/0145588 A1 May 7, 2020

Related U.S. Application Data

(63) Continuation of application No. PCT/JP2018/026023, filed on Jul. 10, 2018.

(30) Foreign Application Priority Data

Jul. 14, 2017 (JP) .............................. JP2017-138467

(51) Int. Cl.
*H04N 5/232* (2006.01)
*G06T 7/70* (2017.01)
(Continued)

(52) U.S. Cl.
CPC ....... *H04N 5/232939* (2018.08); *G06F 9/453* (2018.02); *G06T 7/0002* (2013.01);
(Continued)

(58) Field of Classification Search
CPC .......... H04N 5/232939; H04N 5/23222; G06F 9/453; G06T 2207/10021; G06T 2207/30244
See application file for complete search history.

(56) References Cited

U.S. PATENT DOCUMENTS

| 8,933,996 B2* | 1/2015 | Hashimoto | ........ H04N 5/23299 348/50 |
| 9,338,440 B2* | 5/2016 | Li | ........ H04N 5/23206 |

(Continued)

FOREIGN PATENT DOCUMENTS

| JP | 2013-225245 A | 10/2013 |
| JP | 2017-53724 A | 3/2017 |

(Continued)

OTHER PUBLICATIONS

Zhengyou Zhang, A Flexible New Technique for Camera Calibration, IEEE Transactions on Pattern Analysis and Machine Intelligence, vol. 22, No. 11, Nov. 2000, pp. 1330-1334.

(Continued)

*Primary Examiner* — John Villecco
(74) *Attorney, Agent, or Firm* — Canon U.S.A., Inc. IP Division

(57) ABSTRACT

An information processing apparatus presenting information to an operator operating an image pickup device includes an image-pickup range setting portion setting an image pickup range over which an image can be taken by the image pickup device, a position and orientation calculation portion calculating a position and orientation of the image pickup device by using the image taken by the image pickup device, an evaluation portion evaluating an image pickup situation in the image pickup range, set by the image-pickup range setting portion, on the basis of the position and orientation calculated by the position and orientation calculation portion, and a guide information presentation portion present- (Continued)

ing, in accordance with evaluation by the evaluation portion, guide information for guiding an operation of the image pickup device on a display device.

20 Claims, 17 Drawing Sheets

(51) Int. Cl.
*G06F 9/451* (2018.01)
*G06T 7/00* (2017.01)
*G06T 19/00* (2011.01)

(52) U.S. Cl.
CPC ............... *G06T 7/70* (2017.01); *G06T 19/00* (2013.01); *H04N 5/23222* (2013.01)

(56) References Cited

U.S. PATENT DOCUMENTS

| | | | |
|---|---|---|---|
| 9,373,196 B2* | 6/2016 | Fukuchi | G06F 3/011 |
| 9,552,677 B2* | 1/2017 | Fukuchi | G06T 19/006 |
| 9,842,435 B2* | 12/2017 | Fukuchi | G06K 9/6267 |
| 9,912,862 B2* | 3/2018 | Peruch | G01B 11/24 |
| 9,934,608 B2* | 4/2018 | Castillo | G06T 19/20 |
| 10,038,838 B2* | 7/2018 | Castillo | H04N 5/23222 |
| 10,171,730 B2* | 1/2019 | Kobayashi | H04N 5/23222 |
| 10,324,523 B2* | 6/2019 | Yamamoto | G06F 3/147 |
| 10,489,651 B2* | 11/2019 | Luccin | G06K 9/2063 |
| 10,602,056 B2* | 3/2020 | Roberts | H04N 5/23299 |
| 10,681,264 B2* | 6/2020 | Castillo | H04N 5/23222 |
| 10,950,053 B2* | 3/2021 | Fukuchi | G06T 19/006 |
| 2014/0267593 A1* | 9/2014 | Kim | H04N 5/23206 |
| | | | 348/36 |
| 2014/0327792 A1* | 11/2014 | Mulloni | H04N 5/23296 |
| | | | 348/211.8 |
| 2015/0077434 A1 | 3/2015 | Fukuchi | |
| 2018/0103209 A1* | 4/2018 | Fischler | H04N 13/221 |
| 2019/0089899 A1* | 3/2019 | Watari | H04N 5/23222 |
| 2020/0012877 A1* | 1/2020 | Kotake | G06K 9/3208 |
| 2020/0143565 A1* | 5/2020 | Festa | G06T 7/75 |

FOREIGN PATENT DOCUMENTS

| | | | |
|---|---|---|---|
| JP | 2017053724 A | * | 3/2017 |
| JP | 2017-91470 A | | 5/2017 |
| JP | 2017091470 A | * | 5/2017 |

OTHER PUBLICATIONS

Richard A. Newcombe et al. KinectFusion: Real-Time Dense Surface Mapping and Tracking, IEEE ISMAR 2011, Oct. 2011.
Jakob Engel et al., Large-Scale Direct SLAM with Stereo Cameras, Proc. 2015 IEEE/RSJ International Conference on Intelligent Robots and Systems (IROS), pp. 1935-1942, Sep. 2015.
Hirokazu Kato et al., Marker Tracking and HMD Calibration for a Video-based Augmented Reality Conferencing System, International Workshop on Augmented Reality, Feb. 1999.
Raul Mur-Artal et al., ORB-SLAM: a Versatile and Accurate Monocular SLAM System, IEEE Transactions on Robotics, vol. 31, No. 5, pp. 1147-1163, Oct. 2015.
Georg Klein et al., Parallel Tracking and Mapping for Small AR Workspaces, Proc. ISMAR, pp. 225-234, Jan. 2007.
Martin Bauer et al., Predicting and estimating the accuracy of n-ocular optical tracking systems, Proc. 5th IEEE and ACM International symposium on Mixed and Augmented Reality, pp. 43-51, Oct. 2006.

* cited by examiner

FIG. 3

| POSITION | POSTURE | IMAGE-PICKUP COMPLETION FLAG |
|---|---|---|
| (1.0, 1.0, 1.0) | (0.0, 1.0, 0.0) | True |
| | . . . | . . . |
| | (0.0, 0.0, 1.0) | False |
| . . . | (0.0, 1.0, 0.0) | False |
| | . . . | . . . |
| | (0.0, 0.0, 1.0) | True |
| (13.0, 0.0, 41.0) | (0.0, 1.0, 0.0) | False |
| | . . . | . . . |
| | (0.0, 0.0, 1.0) | False |

EVALUATION-TARGET POSITION AND POSTURE LIST

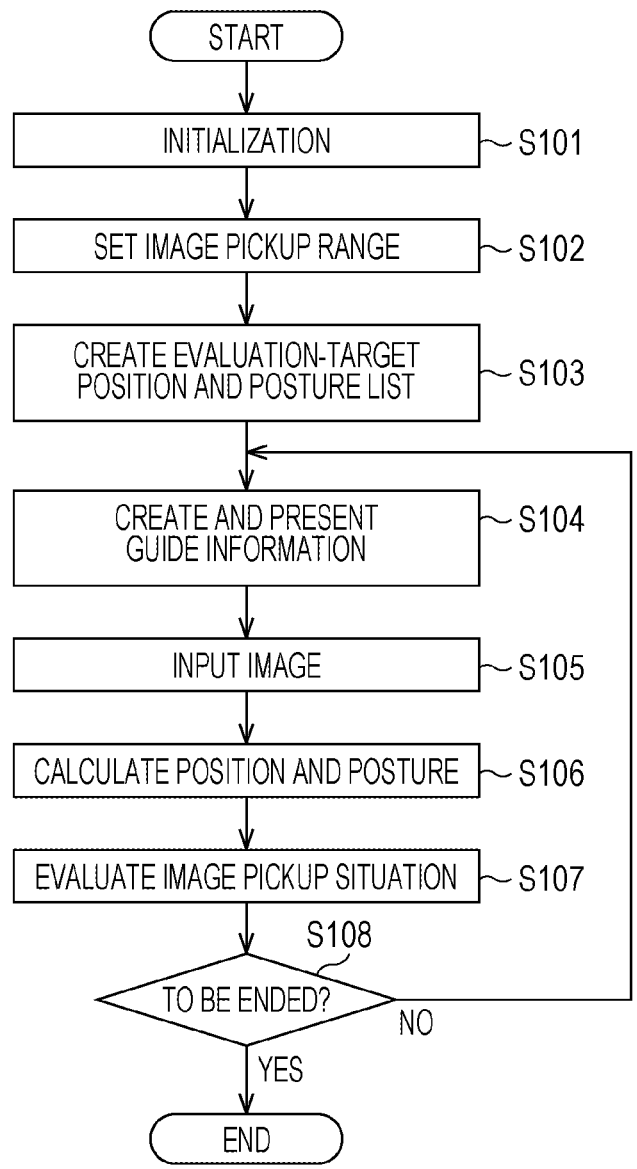

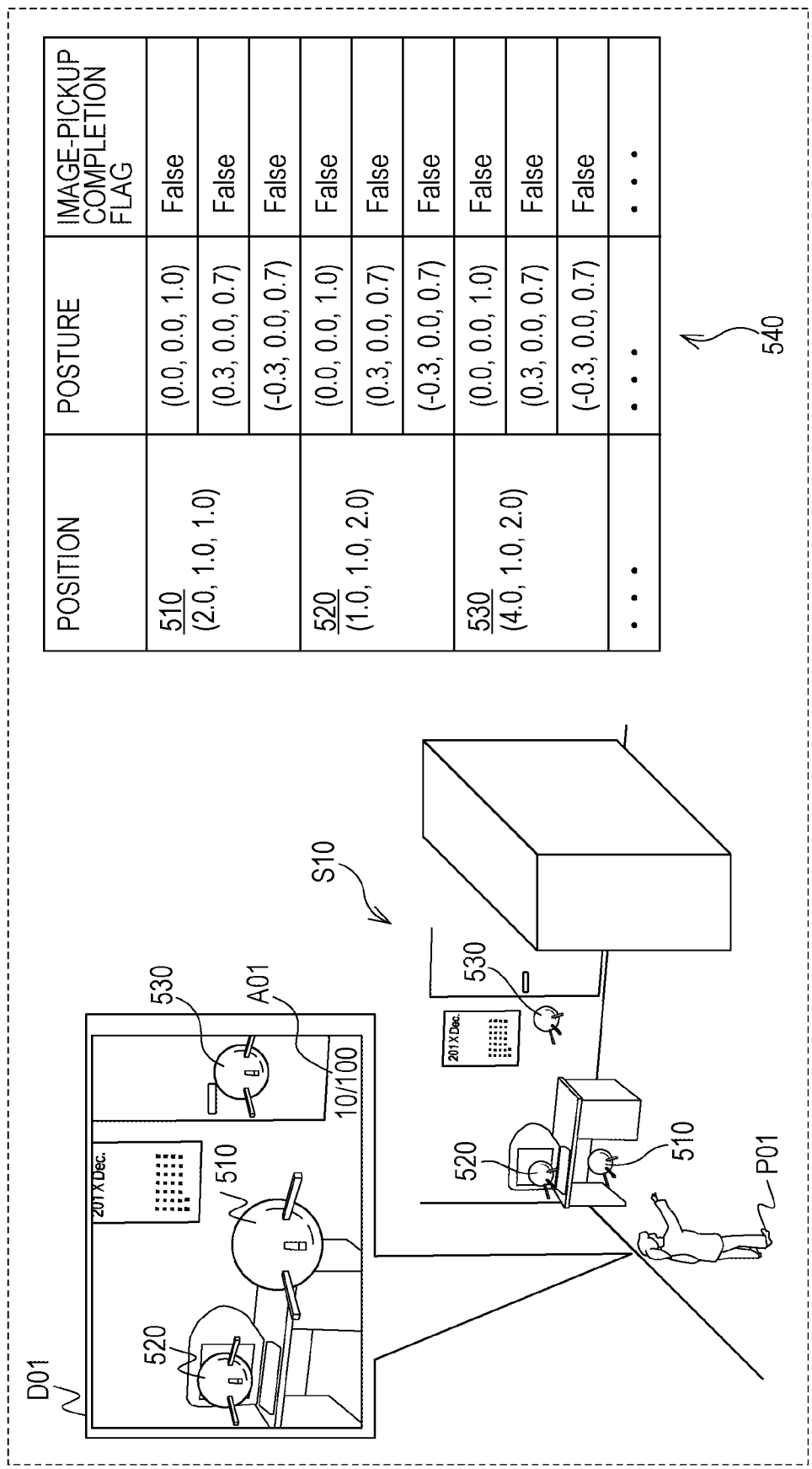

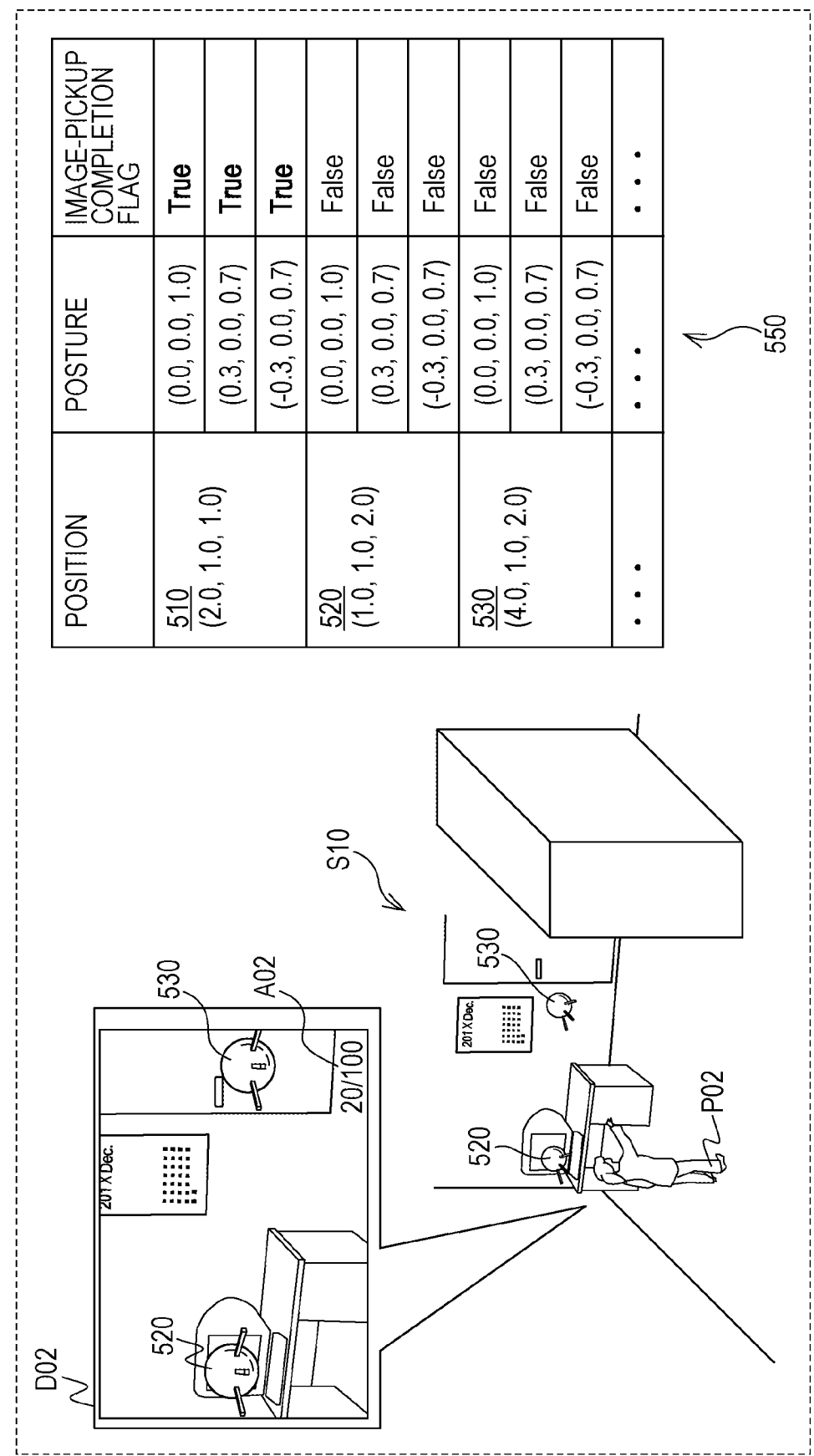

INFORMATION PROCESSING APPARATUS PRESENTING INFORMATION, INFORMATION PROCESSING METHOD, AND STORAGE MEDIUM

CROSS-REFERENCE TO RELATED APPLICATIONS

This application is a Continuation of International Patent Application No. PCT/JP2018/026023, filed Jul. 10, 2018, which claims the benefit of Japanese Patent Application No. 2017-138467, filed Jul. 14, 2017, both of which are hereby incorporated by reference herein in their entirety.

TECHNICAL FIELD

The present invention relates to an information processing apparatus presenting information to an operator who operates an image pickup device, an information processing method, and a storage medium.

BACKGROUND ART

A technique for calculating a position and orientation of an image pickup device, such as a camera or a three-dimensional measuring sensor, on the basis of features (geometrical features) included in an image, which has been taken by the image pickup device, is utilized in, for example, self-position estimation of a robot, or alignment between a real space and a virtual body in mixed reality/augmented reality (MR/AR), the alignment being realized with an operator operating (e.g., moving) the image pickup device. Regarding such a technique, Japanese Patent Laid-Open No. 2013-225245, for example, proposes a method of presenting a guide object for guiding the operator during AR experience such that recognition of the position and orientation of the image pickup device is stabilized.

SUMMARY OF INVENTION

The present invention provides an information processing apparatus presenting information to an operator who operates an image pickup device, the information processing apparatus including setting unit configured to set an image pickup range over which an image can be taken by the image pickup device, calculation unit configured to calculate a position and orientation of the image pickup device by using the image taken by the image pickup device, evaluation unit configured to evaluate an image pickup situation in the image pickup range on the basis of the position and orientation calculated by the calculation unit, and information presentation unit configured to present, in accordance with evaluation by the evaluation unit, guide information for guiding an operation of the image pickup device.

The above-described method proposed in Japanese Patent Laid-Open No. 2013-225245 does not anticipate the case of calculating the position and orientation of the image pickup device all over a range that the operator operating the image pickup device can experience. Accordingly, when the above-described method is used to hold, as a three-dimensional map, the features (geometrical features) within the range that the operator wants to experiment in a state free from any movements of a moving object, etc. and to calculate the position and orientation of the image pickup device by using the three-dimensional map, there is a possibility of reduction in accuracy and stability.

The present invention has been accomplished in consideration of the above-described problem, and an object of the present invention is to provide a scheme enabling a three-dimensional map to be created all over the range that the operator operating the image pickup device can experience.

Further features of the present invention will become apparent from the following description of exemplary embodiments with reference to the attached drawings.

BRIEF DESCRIPTION OF DRAWINGS

FIG. 3 illustrates one example of a data structure of an evaluation-target position and orientation list created by an evaluation portion illustrated in FIG. 1.

FIG. 4 is a flowchart illustrating one example of processing procedures in a control method for the information processing apparatus according to the first embodiment of the present invention.

FIG. 5B is an explanatory view referenced to explain guide information presented by the guide information presentation portion illustrated in FIG. 1.

FIG. 5C is an explanatory view referenced to explain guide information presented by the guide information presentation portion illustrated in FIG. 1.

DESCRIPTION OF EMBODIMENTS

Modes for carrying out the present invention (i.e., embodiments) will be described below with reference to the drawings.

First Embodiment

To begin with, a first embodiment of the present invention is described.

Figure 1:
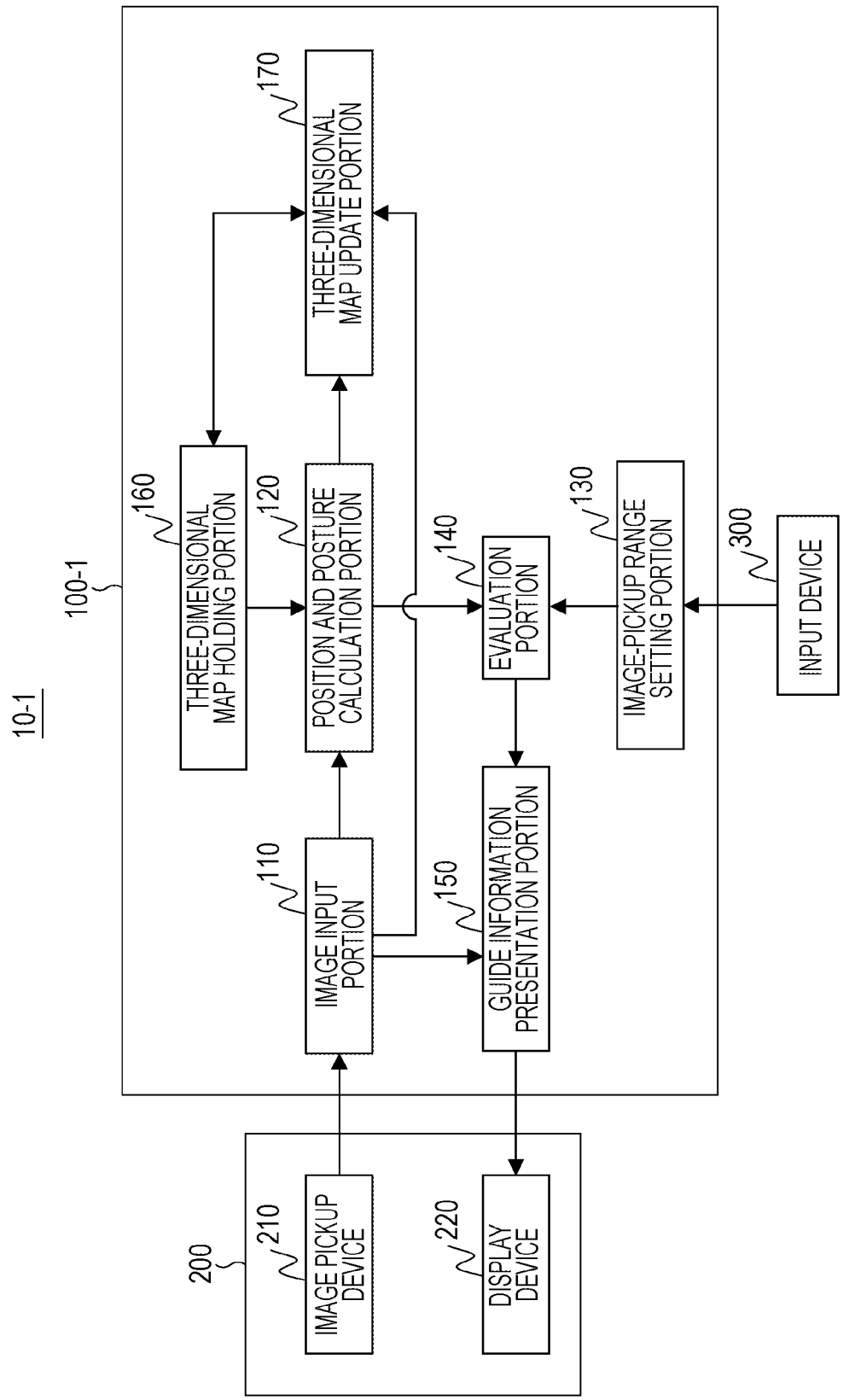
FIG. 1 is a block diagram illustrating one example of a schematic configuration of an image processing system including an information processing apparatus according to a first embodiment of the present invention.

FIG. 1 is a block diagram illustrating one example of a schematic configuration of an image processing system 10-1 including an information processing apparatus 100-1 according to a first embodiment of the present invention. The image processing system 10-1 includes, as illustrated in FIG. 1, the information processing apparatus 100-1, a Head Mounted Display (HMD) 200, and an input device 300.

In the image processing system 10-1 according to this embodiment, an operator operating (for example, moving in this embodiment) the Head Mounted Display 200 wears the Head Mounted Display 200, and the image processing system 10-1 assists in creating a three-dimensional map all over a range that the operator can experience the mixed reality (MR), etc. More specifically, as illustrated in FIG. 1, the Head Mounted Display 200 includes an image pickup device 210, such as a set of stereo cameras, and a display device 220 displaying an image of a real space, for example, that has been taken by the image pickup device 210. The information processing apparatus 100-1 displays, on the display device 220, the image of the real space taken by the image pickup device 210 and guide information for guiding operation of the image pickup device 210 in order to guide the operator in operating the image pickup device 210. With the operator operating (for example, moving in this embodiment) the image pickup device 210 in accordance with the guide information, the three-dimensional map can be created all over the range that the operator can experience.

The input device 300 inputs various types of information to the information processing apparatus 100-1. In this embodiment, for example, the input device 300 inputs, to the information processing apparatus 100-1, information of an image pickup range over which an image can be taken by the image pickup device 210 and which corresponds to the range that the operator can experience. The input device 300 can be constituted by an input device such as a mouse or a keyboard, for example.

The information processing apparatus 100-1 executes a process of presenting information to the operator operating (for example, moving in this embodiment) the Head Mounted Display 200 that includes the image pickup device 210 and the display device 220. As illustrated in FIG. 1, the information processing apparatus 100-1 includes various functional components, i.e., an image input portion 110, a position and orientation calculation portion 120, an image-pickup range setting portion 130, an evaluation portion 140, a guide information presentation portion 150, a three-dimensional map holding portion 160, and a three-dimensional map update portion 170. Although the image processing apparatus 10-1 illustrated in FIG. 1 has a configuration in which the three-dimensional map holding portion 160 and the three-dimensional map update portion 170 are disposed inside the information processing apparatus 100-1, this embodiment is not limited to such a configuration. For example, this embodiment may also be implemented in another configuration in which the three-dimensional map holding portion 160 and the three-dimensional map update portion 170 are disposed outside the information processing apparatus 100-1.

The image input portion 110 obtains images of the real space, which have been taken by the image pickup device 210, from the image pickup device 210 in time series (e.g., 60 frames/sec), and inputs the images to the position and orientation calculation portion 120, the guide information presentation portion 150, and the three-dimensional map update portion 170.

The position and orientation calculation portion 120 calculates a position and orientation of the image pickup device 210 by using the images input from the image input portion 110 and a three-dimensional map held in the three-dimensional map holding portion 160. For example, the position and orientation calculation portion 120 can calculate the position and orientation of the image pickup device 210 by the method described in J. Engel, J. Stuckler, and D. Cremers, "Large-Scale Direct SLAM with Stereo Cameras," Proc. 2015 IEEE/RSJ International Conference on intelligent Robots and Systems (IROS), pp. 1935-1942, 2015.

In this embodiment, it is assumed that the position of the image pickup device 210, calculated by the position and orientation calculation portion 120, is expressed by three parameters indicated by coordinates specified in the three-dimensional real space (e.g., position coordinates (X-coordinate, Y-coordinate, and Z-coordinate)). In this embodiment, it is further assumed that the orientation of the image pickup device 210, calculated by the position and orientation calculation portion 120, expressed by three parameters indicated by coordinates specified in the three-dimensional real space (e.g., orientation vectors (X-axis direction, Y-axis direction, and Z-axis direction)). Those three parameters indicating the position of the image pickup device 210 and those three parameters indicating the orientation of the image pickup device 210 are each denoted in ( ) in later-described FIG. 3, for example.

The image-pickup range setting portion 130 sets, on the basis of the information of the image pickup range input from the input device 300, the image pickup range over which an image can be taken by the image pickup device 210 and which corresponds to the range that the operator can experience.

The evaluation portion 140 evaluates an image pickup situation in the image pickup range, which has been set by the image-pickup range setting portion 130, on the basis of the positions and orientations calculated by the position and orientation calculation portion 120. More specifically, in this embodiment, the evaluation portion 140 first determines evaluation-target positions and orientations of the image pickup device 210 on the basis of the image pickup range that has been determined by the image-pickup range setting portion 130, and creates a list of the determined positions and orientations (hereinafter referred to as an "evaluation-target position and orientation list"). For example, the evaluation portion 140 divides the image pickup range set by the image-pickup range setting portion 130 at predetermined intervals, and determines the evaluation-target position and orientation of the image pickup device 210 for each interval. Then, the evaluation portion 140 evaluates the image pickup situation in the image pickup range, which has been set by the image-pickup range setting portion 130, on the basis of each set of the position and orientation in the created evaluation-target position and orientation list and the position and orientation calculated by the position and orientation calculation portion 120.

The guide information presentation portion 150 executes, in accordance with the evaluation result of the evaluation portion 140, processing to present guide information for guiding the operation (for example, movement in this embodiment) of the image pickup device 210. More specifically, the guide information presentation portion 150 executes the processing to present the guide information to the operator by performing a process of displaying the guide information on the display device 220 that the operator views. On that occasion, the guide information presentation portion 150 may employ a superimposition process of displaying the guide information on the display device 220 in a superimposed relation to an image input from the image input portion 110. Alternatively, the guide information presentation portion 150 may employ a process of displaying the guide information on the display device 220 in a region different from the image input from the image input portion 110. Although this embodiment illustrates the case of combining the guide information with the image in the guide information presentation portion 150, the present invention is not limited to that case. As another example, the present invention may also be implemented in a manner of outputting, to the display device 220, the image from the image input portion 110 and the guide information from the guide information presentation portion 150, combining the guide information with the image in the display device 220, and displaying the combined image and guide information.

The three-dimensional map holding portion 160 holds the three-dimensional map that is used when the position and orientation calculation portion 120 calculates the position and orientation of the image pickup device 210. Here, it is assumed that the three-dimensional map is represented by expressing, with the three-dimensional coordinates, geometrical features of the range that the operator can experience (i.e., the range corresponding to the image pickup range). In addition, the three-dimensional map holding portion 160 can also hold the three-dimensional map as an assembly of key frames, for example, similarly to the method described in the above-cited "Large-Scale Direct SLAM with Stereo Cameras".

The three-dimensional map update portion 170 executes processing to update the three-dimensional map, which is held in the three-dimensional map holding portion 160, in accordance with the image input from the image input portion 110 and the position and orientation calculated by the position and orientation calculation portion 120.

Figure 2:
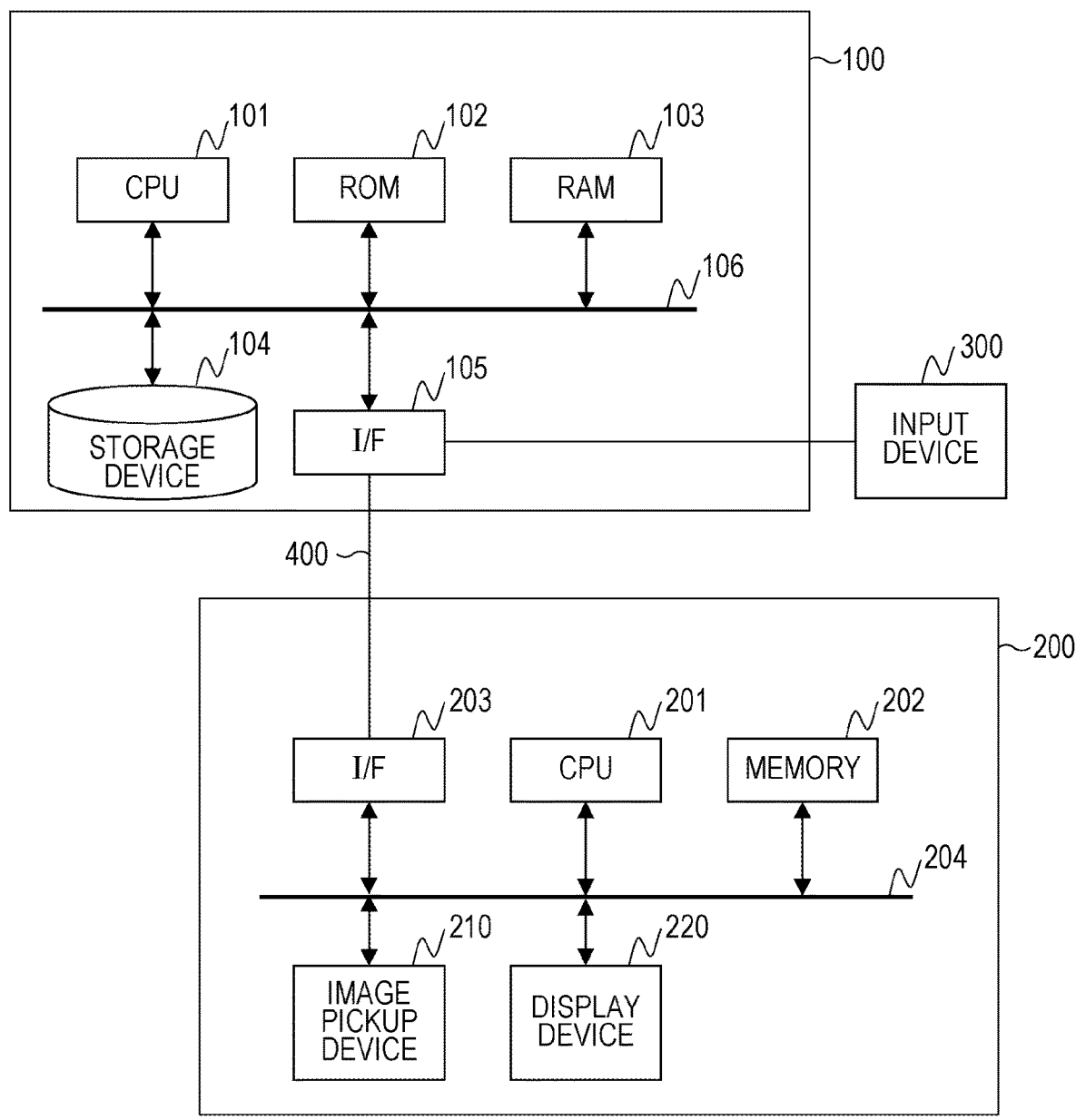
FIG. 2 is a block diagram illustrating one example of a hardware configuration of the image processing system including the information processing apparatus according to the embodiment of the present invention.

FIG. 2 is a block diagram illustrating one example of a hardware configuration of the image processing system 10 including the information processing apparatus 100 according to the embodiment of the present invention. In FIG. 2, components similar to those in FIG. 1 are denoted by the same reference signs.

As illustrated in FIG. 2, the information processing apparatus 100 includes various hardware components, i.e., a CPU 101, a ROM 102, a RAM 103, a storage device 104, an I/F (interface) 105, and a bus 106.

The CPU 101 implements various types of control, processing, and functions of the information processing apparatus 100 by executing programs stored in the ROM 102, for example.

The ROM 102 is a read-only nonvolatile memory and stores the programs, various type of information, and various types of data, which are executed and used by the CPU 101 to implement the various types of control, processing, and functions.

The RAM 103 is a volatile memory readable and writable at any time and is used as a work memory for the CPU 101.

The storage device 104 is a large-capacity storage medium such as a hard disk. The storage device 104 stores, as required, various types of information, etc. necessary for the CPU 101 to perform various types of control, etc., and various types of information, etc. that are obtained with the various types of control, etc. performed by the CPU 101. Although the programs executed by the CPU 101 to implement the various types of control, etc. are stored in the ROM 102 in this embodiment as described above, those programs may be stored in the storage device 104 as another example.

The I/F 105 executes processing to connect the information processing apparatus 100 with the Head Mounted Display 200 and the input device 300, which are external devices, in a communicable manner. FIG. 2 illustrates a communication line 400 connecting the I/F 105 and the Head Mounted Display 200. Here, the communication line 400 may be a wired communication line or a wireless communication line.

The bus 106 interconnects the CPU 101, the ROM 10 the RAM 103, the storage device 104, and the I/F 105 in a communicable manner.

One example of correspondence relation between the functional components of the information processing apparatus 100-1 illustrated in FIG. 1 and the hardware components of the information processing apparatus 100 illustrated in FIG. 2 is described here.

The image input portion 110, the image-pickup range setting portion 130, and the guide information presentation portion 150 illustrated in FIG. 1 are constituted, for example, by the CPU 101, the programs stored in the ROM 102, and the I/F 105 illustrated in FIG. 2. The position and orientation calculation portion 120, the evaluation portion 140, and the three-dimensional map update portion 170 illustrated in FIG. 1 are constituted, for example, by the CPU 101 and the programs stored in the ROM 102 illustrated in FIG. 2. The three-dimensional map holding portion 160 illustrated in FIG. 1 is constituted, for example, by the CPU 101, the program stored in the ROM 102, and the storage device 104 illustrated in FIG. 2.

Furthermore, as illustrated in FIG. 2, the Head Mounted Display 200 includes various hardware components, i.e., a CPU 201, a memory 202, an I/F (interface) 203, a bus 204, the image pickup device 210, and the display device 220.

The CPU 201 implements various types of control, processing, and functions of the Head Mounted Display 200 by executing programs stored in the memory 202, for example.

The memory 202 stores the programs, various type of information, and various types of data, which are executed and used by the CPU 201 to implement the various types of control, processing, and functions. Furthermore, the memory 202 stores various type of information, etc. that are obtained with the CPU 201 executing various type of control, etc.

The I/F 203 executes processing to connect the Head Mounted Display 200 with the information processing apparatus 100, which is an external device, in a communicable manner via the communication line 400.

Moreover, as in FIG. 1, the image pickup device 210 is a device for taking an image, such as a set of stereo cameras, and the display device 220 is a device for displaying, for example, an image taken by the image pickup device 210.

The bus 204 interconnects the CPU 201, the memory 202, the I/F 203, the image pickup device 210, and the display device 220 in a communicable manner.

FIG. 3 illustrates one example of a data structure of the evaluation-target position and orientation list created by the evaluation portion 140 illustrated in FIG. 1.

The evaluation-target position and orientation list illustrated in FIG. 3 indicates information regarding one set of position and orientation in a one horizontal row. The information regarding each set of position and orientation includes the position of the image pickup device 210, which is expressed by, for example, the position coordinates (X-coordinate, Y-coordinate, and Z-coordinate), the orientation of the image pickup device 210, which is expressed by, for example, the orientation vectors (X-axis direction, Y-axis direction, and Z-axis direction), and information of an image-pickup completion flag. Here, the image-pickup completion flag is a flag representing whether image pickup is completed in the relevant position and orientation of the image pickup device 210 (speaking in a broader sense, whether image pickup needs to be performed).

Processing procedures in a control method for the information processing apparatus 100-1 illustrated in FIG. 1 will be described below.

FIG. 4 is a flowchart illustrating one example of the processing procedures in the control method for the information processing apparatus 100-1 according to the first embodiment of the present invention.

First, in step S101 of FIG. 4, the information processing apparatus 100-1 executes an initialization process for various parameters and the three-dimensional map. In this initialization process, the information processing apparatus 100-1 reads camera parameters including internal parameters of the image pickup device 210 (such as a focal length, an image center, and a lens distortion parameter) and a relative position and orientation of the image pickup device 210 (external parameters), and further calculates a position and orientation of the image pickup device 210 in an initial state.

Here, the internal parameters of the image pickup device 210 are previously calibrated by, for example, the Zhang's method described in Z. Zhang, "A flexible new technique for camera calibration," IEEE Trans. on Pattern Analysis and Machine intelligence, vol. 22, no. 11, pp. 1330-1334, 2000. The external parameters of the image pickup device 210 are determined, for example, by taking images of a pattern having a known three-dimensional shape with left and right stereo cameras, determining a position and orientation of each camera with the pattern being a reference, and by converting each set of the position and orientation to a set of position and orientation with the left camera of the stereo cameras being a reference. Those previously calibrated camera parameters are held in the storage device 104 (or the memory 202) illustrated in FIG. 2.

Furthermore, the position and orientation of the image pickup device 210 in the initial state are calculated by the method of Kato et al., which is described in H. Kato and M. Billinghurst, "Marker tracking and hmd calibration for a video-based augmented reality conferencing system," International Workshop on Augmented Reality, 1999, while a marker is used a reference, the marker being an index that has a known size and enables the position and orientation to be calculated on the basis of a pattern. In this embodiment, a method of calculating the position and orientation of the image pickup device 210 in the initial state is not limited to the above-described method. Any suitable method such as setting a start position to be the origin, for example, may be used insofar as a relative relation between a three-dimensional space for the image pickup range set in later-described step S102 and a three-dimensional space representing the position and orientation of the image pickup device 210 can be determined.

Then, in step S102, the image-pickup range setting portion 130 sets, on the basis of the information of the image pickup range input from the input device 300, the image pickup range over which an image can be taken by the image pickup device 210 and which corresponds to the range that the operator can experience. In this embodiment, the image-pickup range setting portion 130 sets the range over which the image can be taken in each of the X-axis direction, the Y-axis direction, and the Z-axis direction) of the three-dimensional space.

Then, in step S103, the evaluation portion 140 determines the evaluation-target positions and orientations of the image pickup device 210 on the basis of the image pickup range set in step S102, and creates a list of the determined positions and orientations, i.e., the evaluation-target position and orientation list. More specifically, for example, the evaluation portion 140 calculates the position and orientation for each of key frames sufficient for the operator to experience the mixed reality (MR), etc. within the image pickup range set in step S102, thereby creating the evaluation-target position and orientation list. At that time, the evaluation-target position and orientation are determined in accordance with an interval of the key frames, which is ideal from the viewpoint of stabilizing the calculation of the position and orientation. Assuming, for example, that the image pickup range of 1 $m^3$ is input from the input device 300 and the key frames at intervals of 50 cm in the front and at angular intervals of 30 degrees on the left and right sides are ideal, the evaluation portion 140 determines, as the evaluation-target positions and orientations, a total 81 sets of positions and orientations including orientations in three directions for each of 27 positions. A method of determining the evaluation-target positions and orientations is not limited to the above-described method, and the intervals of the positions and orientations may be input and set from the input device 300.

Then, in step S104, the guide information presentation portion 150 executes processing to create the guide information for guiding the operation (for example, movement in this embodiment) of the image pickup device 210 on the basis of the position and orientation of the image pickup device 210 in the initial state, which have been calculated in step S101, or on the basis of a position and orientation of the image pickup device 210, which is calculated in a later-described step S106, and the evaluation-target position and orientation list created in step S103. Thereafter, the guide information presentation portion 150 executes processing to display the created guide information on the display device 220 and to present it to the operator.

Figure 5A:
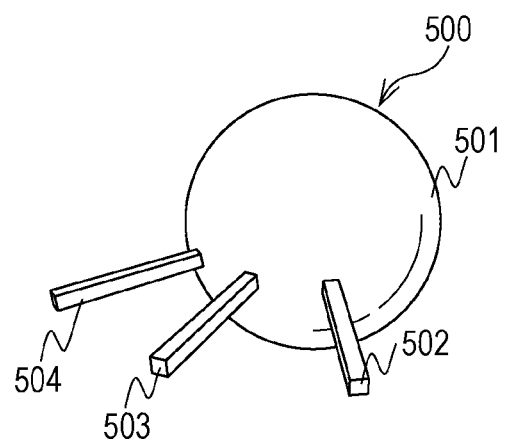
FIG. 5A is an explanatory view referenced to explain guide information presented by a guide information presentation portion illustrated in FIG. 1.

FIGS. 5A to 5C are each an explanatory view referenced to explain guide information presented by the guide information presentation portion 150 illustrated in FIG. 1.

As illustrated in FIG. 5A, for example, the guide information presentation portion 150 creates guide information 500 in the form of an object representing the position of the image pickup device 210 by a sphere 501 and the orientation of the image pickup device 210 by rods 502 to 504 stuck to the sphere 501. Here, each of the rods 502 to 504 represents the evaluation-target orientation as the direction of a sight vector and instructs the operator to take a direction parallel to the vector toward the sphere 501 from an end point of the relevant rod. The operator can take the evaluation-target position and orientation by approaching the position of the sphere 501 from the direction of the rod 502.

FIG. 5B is now described.

FIG. 5B represents three kinds of guide information 510 to 530, present in a virtual space formed by augmenting a real space S10, corresponding to the evaluation-target positions and orientations for which the image-pickup completion flag is set to False in an evaluation-target position and orientation list 540. The guide information presentation portion 150 presents, through the display device 220, a presentation image D01 including the three kinds of guide information 510 to 530 to the operator who is present at a position P01 in the real space S10 and who wears the Head Mounted Display 200. A method of presenting the three kinds of guide information 510 to 530 is not limited to the method illustrated in FIG. 5, and the three kinds of guide information 510 to 530 may be displayed and presented with use of four-sided pyramids or arrows insofar as the position and orientation of the image pickup device 210 to guided can be recognized. Moreover, they may be presented in different colors depending on the number of orientations.

The guide information presentation portion 150 further presents, in the presentation image D01, progress rate information A01 indicating a rate of the positions and orientations for which the image-pickup completion flag is set to True (i.e., the positions and orientations at which image pickup is completed (speaking in a broader sense, the positions and orientations at which image pickup is not needed)) among the evaluation-target positions and orientations in the evaluation-target position and orientation list 540. A method of presenting the progress rate information A01 may be performed by representing a progress rate in a percentage or a fraction insofar as the progress rate can be recognized.

Now, return to explanation of FIG. 4 again.

After the end of the processing in step S104, the procedure goes to step S105.

In step S105, the image input portion 110 obtains an image of the real space, which has been taken by the image pickup device 210, from the image pickup device 210, and inputs the image to the position and orientation calculation portion 120, the guide information presentation portion 150, and the three-dimensional map update portion 170.

Then, in step S106, the position and orientation calculation portion 120 calculates the position and orientation of the image pickup device 210 by using the image input in step S105. More specifically, in this step, the position and orientation calculation portion 120 calculates the position and orientation of the image pickup device 210 in a world coordinate system by using both the image input in step S105 and the three-dimensional map held in the three-dimensional map holding portion 160. In this embodiment, it is assumed that the position and orientation of the image pickup device 210 are calculated by the method of Engel et al. When the three-dimensional map update portion 170 updates the three-dimensional map held in the three-dimensional map holding portion 160 in accordance with the position and orientation of the image pickup device 210, which have been calculated by the position and orientation calculation portion 120, the position and orientation calculation portion 120 calculates the position and orientation by using the updated three-dimensional map. Update of the three-dimensional map by the three-dimensional map update portion 170 is performed, for example, by updating the existing key frame or adding a new key frame in accordance with the method of Engel et al.

Then, in step S107, the evaluation portion 140 evaluates an image pickup situation in the image pickup range, which has been set in step S102, on the basis of the position and orientation calculated in step S106. More specifically, in this step, the evaluation portion 140 evaluates the image pickup situation in the image pickup range, which has been set in step S102, on the basis of each set of the position and orientation listed in the evaluation-target position and orientation list created in step S103, as well as the position and orientation calculated in step S106.

One example of the evaluation method in the evaluation portion 140 is described with reference to FIG. 5C.

FIG. 5C represents a situation in which the operator has moved from the position P01 illustrated in FIG. 5B to a position P02 illustrated in FIG. 5C. More specifically, FIG. 5C represents the case in which a difference between a set of the position and orientation corresponding to the guide information 510 in FIG. 5B and a set of the position and orientation of the image pickup device 210 that the operator wears is not more than a threshold. In this case, the evaluation portion 140 changes, in processing of step S107, the image-pickup completion flag for a set of the position and orientation corresponding to the guide information 510 to True in an evaluation-target position and orientation list 550 illustrated in FIG. 5C. As a result of the update to the evaluation-target position and orientation list 550, the guide information 510 is excluded from a presentation image D02 illustrated in FIG. 5C in execution of the processing of step S104 that is performed after determination in later-described step S108 has been denied (S108/NO). In this embodiment, when the image-pickup completion flags for the sets of the positions and orientations listed in the evaluation-target position and orientation list have all been changed to True, the evaluation portion 140 evaluates the image pickup situation in the image pickup range, which has been set in step S102, to be OK.

Then, in step S108, the evaluation portion 140 determines whether the image-pickup completion flags in the evaluation-target position and orientation list created in step S103 have all been changed to True and the image pickup situation has become OK (namely, whether the processing is to be ended). Although this embodiment is described in connection with the case of determining the processing to be ended when the image-pickup completion flags in the evaluation-target position and orientation list created in step S103 have all been changed to True and the image pickup situation has become OK, this embodiment is not limited to that case. For example, this embodiment may be modified to determine the processing to be ended when end instruction information is input from the input device 300.

If the image pickup situation is not OK as a result of the determination in step S108 (namely, if the image pickup situation is NG and the processing is not to be ended) (S108/NO), the procedure returns to step S104 to execute the processing of S104 and the subsequent steps again. In this case, the guide information is presented in step S104 depending on a current state of the image-pickup completion flags in the evaluation-target position and orientation list.

On the other hand, if the image pickup situation is OK as a result of the determination in step S108 (namely, if the processing is to be ended) (S108/YES), the processing of the flowchart illustrated in FIG. 4 is ended.

Modification 1 of First Embodiment

Modification 1 of the above first embodiment of the present invention will be described below.

Although the first embodiment of the present invention has been described above in connection with the case of using a set of stereo cameras as the image pickup device 210, the present invention is not limited to that case. The image pickup device 210 may be any type of camera insofar as the camera can take an image of the real space. For example, the image pickup device 210 may be a single-lens camera, or may be constituted by three or more cameras for which relative positions and orientations are known. Furthermore, the image pickup device 210 is not limited to a camera taking a color image, and it may be a camera taking a grayscale image, a camera taking an image representing depth information, or a camera taking an RGBD image including a color image and depth information as a set. However, when a single-lens camera is used as the image pickup device 210, the depth information is needed to calculate the position and orientation and to calculate a re-projection error. Thus, the depth information is calculated from a motion of the relevant camera by the method of Klein et al., which is described in G. Klein and D. Murray, "Parallel tracking and mapping for small AR workspaces," Proc. ISMAR, pp. 225-234, 2007.

An image pickup device for taking an image to calculate the position and orientation and an image pickup device for taking an image with which the guide information is to be combined in the display device 220 may be the same device or separate devices. Moreover, the display device 220 is not limited to a display mounted on the Head Mounted Display 200, and it may be a tablet or a PC display, for example, insofar as it can display an image.

Modification 2 of First Embodiment

Modification 2 of the above first embodiment of the present invention will be described below.

In the above first embodiment of the present invention, the image-pickup range setting portion 130 sets the image pickup range on the basis of input information from the input device 300. However, a method of setting the image pickup range is not limited to that case, and any suitable method can be used insofar as the method can set a range of the three dimensional space. For example, the image-pickup range setting portion 130 may set the image pickup range by arranging, in a space, an artificial index having a range determined for each ID, taking an image of the artificial index, and by recognizing the taken artificial index. In another example, the image-pickup range setting portion 130 may place a plurality of artificial indexes at end points of the image pickup range, take an image from a position enabling images of all the artificial indexes to be taken, recognize a positional relation among the artificial indexes, and sets, as the image pickup range, a range surrounded by the artificial indexes. In still another example, the image-pickup range setting portion 130 may set the image pickup range by moving the image pickup device 210 around a range to be set while the position and orientation of the image pickup device 210 is calculated. Alternatively, the image-pickup range setting portion 130 may set the image pickup range in combination of plural ones among the above-described methods. For example, the image-pickup range setting portion 130 may set the Z-coordinate on the basis of input information from the input device 300, and the X- and Y-coordinates in accordance with movements.

Furthermore, the image-pickup range setting portion 130 may set the image pickup range by limiting three parameters of the orientation instead of using only the X-, Y-, and Z-coordinates of the three-dimensional space. In such a case, the image pickup range may be set by a method of setting, as in the case of using the X-, Y-, and Z-coordinates, a maximum value and a minimum value for each of the three parameters from the input device 300. As an alternative, when an operation is to carefully watch an object placed at one certain point, the range setting may be limited to a orientation carefully watching that one point.

Modification 3 of First Embodiment

Modification 3 of the above first embodiment of the present invention will be described below.

Although the first embodiment of the present invention has been described above in connection with the example in which, as illustrated in FIGS. 5A to 5C, the object indicating the evaluation-target position and orientation is presented as the guide information, the present invention is not limited to that example. In another example, the present invention may be modified to present, as the guide information to be presented by the guide information presentation portion 150, an object indicating a direction of change up to next one set among sets of the evaluation-target positions and orientations. On that occasion, the next one set of the evaluation-target position and orientation may be given by selecting, from the evaluation-target position and orientation list, the position and orientation of the image pickup device 210 closest to the current position and orientation of the image pickup device 210, or by calculating a route capable of passing through the sets of the positions and orientations in the evaluation-target position and orientation list with the shortest distance, and by successively presenting those sets of the positions and orientations along the calculated route.

The guide information presented by the guide information presentation portion 150 may be given as the guide information regarding all the sets of the positions and orientations for which the image-pickup completion flag is set to False in the evaluation-target position and orientation list, as described above in the first embodiment of the present invention, or may be given only as guide information regarding one set of the position and orientation, which is closest to the current position and orientation, among the sets of the positions and orientations for which the image-pickup completion flag is set to False.

Figure 6:
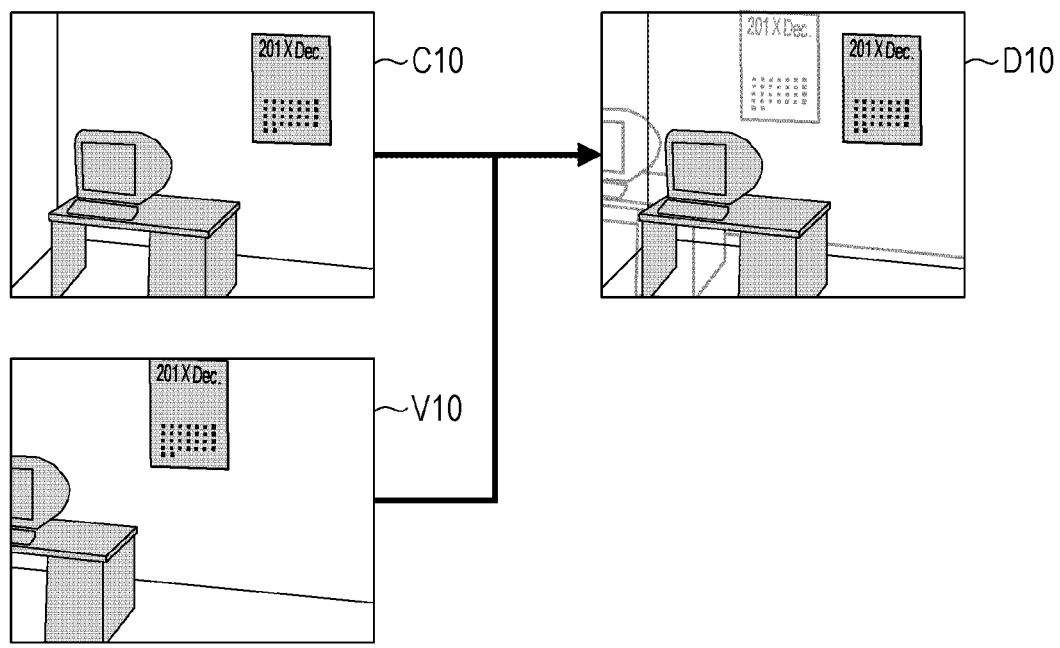
FIG. 6 represents Modification 3 of the first embodiment of the present invention and illustrates one example of a presentation image including the guide information that is presented by the guide information presentation portion illustrated in FIG. 1.

FIG. 6 represents Modification 3 of the first embodiment of the present invention and illustrates one example of a presentation image including the guide information that is presented by the guide information presentation portion 150 illustrated in FIG. 1.

In FIG. 6, an image C10 is an image taken by the image pickup device 210. An image V10 is a virtual sight image taken from the evaluation-target position and orientation. Here, the virtual sight image V10 is produced by projection transform. The guide information presentation portion 150 superimposes the taken image C10 and the virtual sigh image V10 with each other to produce a combined presentation image D10, and displays the presentation image D10 on the display device 220. In the presentation image D10, a portion of the virtual sight image V10 displayed in a lighter shade corresponds to the guide information. The operator can take the evaluation-target position and orientation by moving the portion corresponding to the virtual sight image V10 to be aligned with a portion corresponding to the taken image C10 in the presentation image D10. Additionally, because visibility reduces when the entirety of the virtual sight image V10 is displayed in a superimposed relation, only a portion of the virtual sight image V10 where gradient intensity is high may be displayed.

Figure 7:
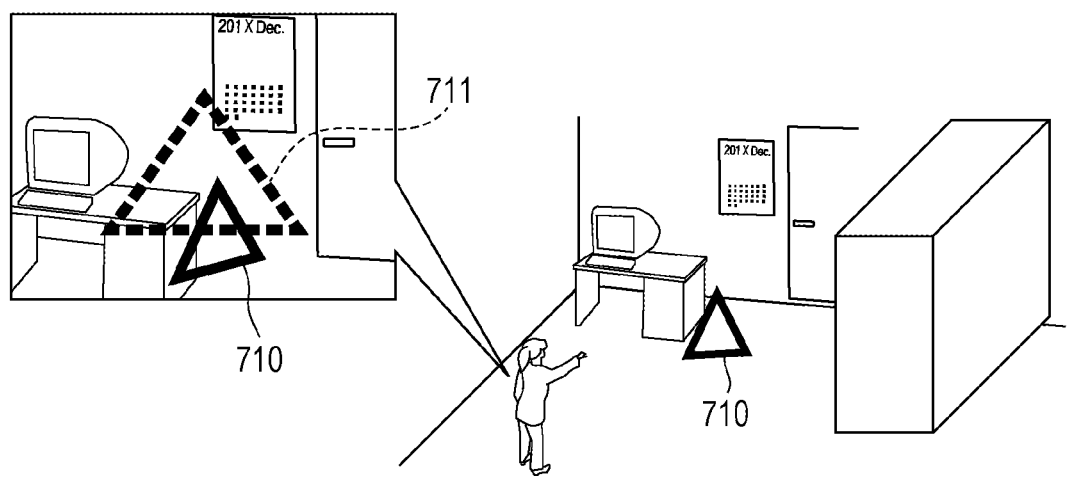
FIG. 7 represents Modification 3 of the first embodiment of the present invention and illustrates another example of the presentation image including the guide information that is presented by the guide information presentation portion illustrated in FIG. 1.

FIG. 7 represents Modification 3 of the first embodiment of the present invention and illustrates another example of the presentation image including the guide information that is presented by the guide information presentation portion 150 illustrated in FIG. 1.

Like a presentation image illustrated in FIG. 7, the guide information may be presented in combination of an object given as a reference body 710 representing the three-dimensional position and orientation in an easily recognizable manner, and an object given an index 711 representing how an image of the reference body 710 is to be taken.

Figure 8:
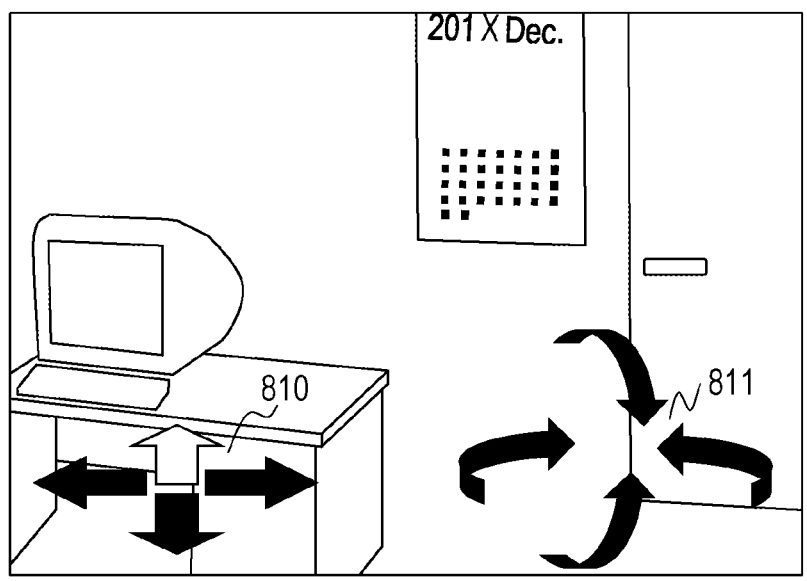
FIG. 8 represents Modification 3 of the first embodiment of the present invention and illustrates still another example of the presentation image including the guide information that is presented by the guide information presentation portion illustrated in FIG. 1.

FIG. 8 represents Modification 3 of the first embodiment of the present invention and illustrates still another example of the presentation image including the guide information that is presented by the guide information presentation portion 150 illustrated in FIG. 1.

Like a presentation image illustrated in FIG. 8, the guide information may be presented to indicate changes of the position and orientation in combination of an object given as an arrow 810 representing translation and an object given as an arrow 811 representing a direction of rotation. Alternatively, the guide may be performed with the aid of a CG avatar. In such a case, the guide with the aid of the CG avatar is performed by displaying the CG avatar at a position away from the current position and orientation of the image pickup device 210 through a predetermined distance, and by moving the CG avatar to follow a path toward the evaluation-target position and orientation. In such a case, with the operator moving to chase the CG avatar, an image can be taken from the evaluation-target position and orientation. Furthermore, when an object indicating a direction of change up to next one set of the evaluation-target position and orientation is presented as the guide information, the evaluation in step S107 may be performed, without being limited to the evaluation using the evaluation-target position and orientation list as described above in the first embodiment, by a guide and evaluation method of evaluating whether a difference relative to an instructed movement path is smaller than a threshold, and issuing an alarm when the difference is not smaller than the threshold.

FIG. 9 represents Modification 3 of the first embodiment of the present invention and illustrates still another example of the presentation image including the guide information that is presented by the guide information presentation portion 150 illustrated in FIG. 1.

Figure 9A:
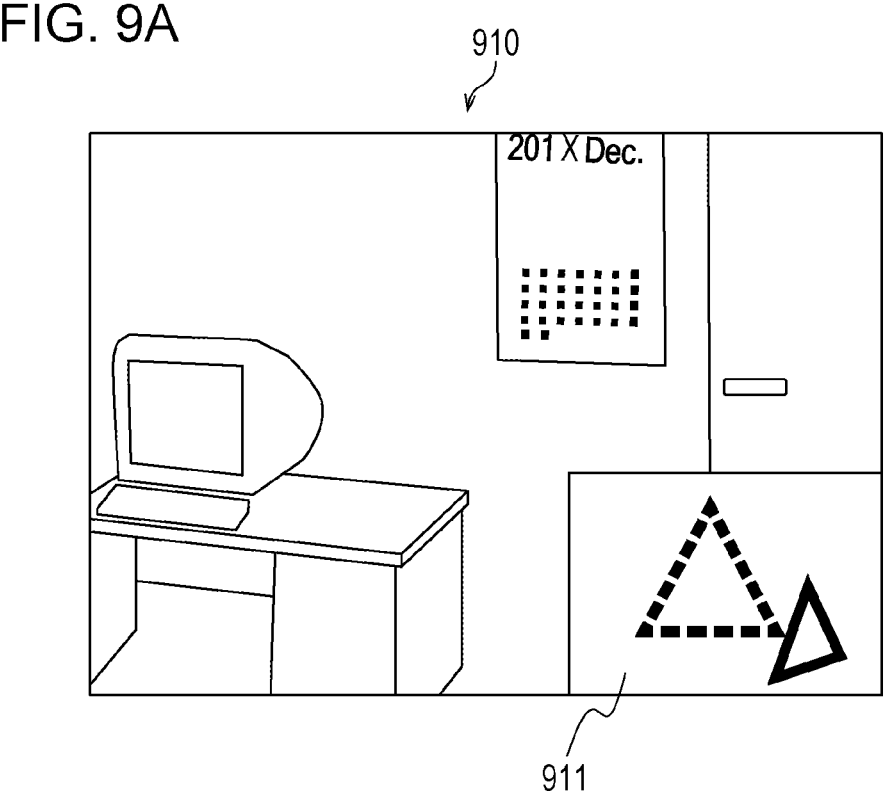
FIG. 9A represents Modification 3 of the first embodiment of the present invention and illustrates still another example of the presentation image including the guide information that is presented by the guide information presentation portion illustrated in FIG. 1.
Figure 9B:
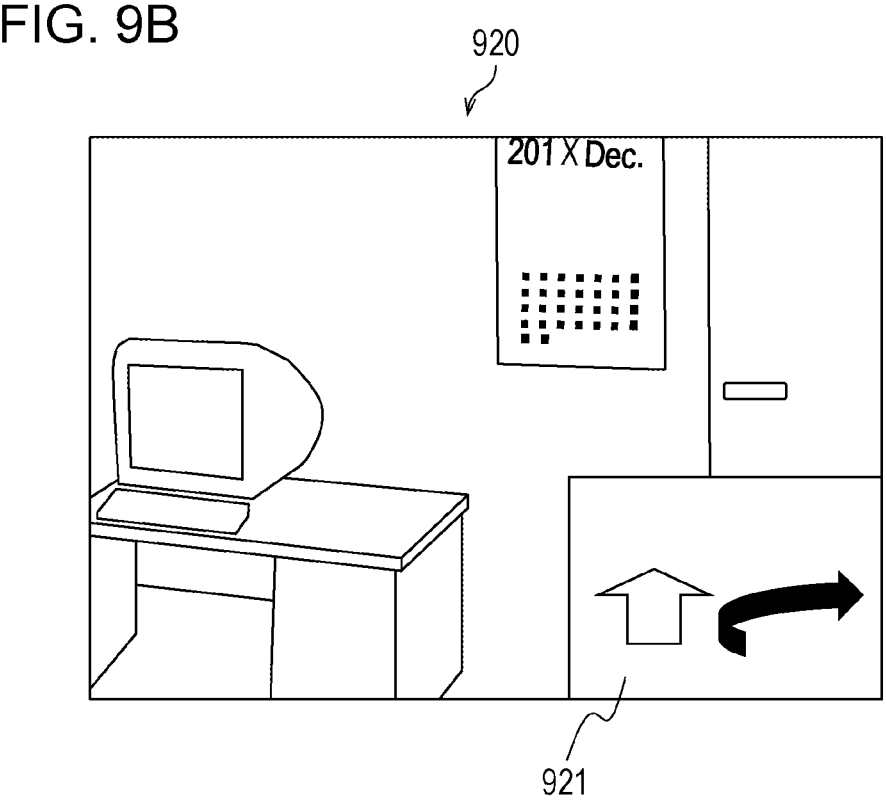
FIG. 9B represents Modification 3 of the first embodiment of the present invention and illustrates still another example of the presentation image including the guide information that is presented by the guide information presentation portion illustrated in FIG. 1.

The presentation images D01 and D02 illustrated in FIGS. 5B and 5C are each presented by drawing the guide information at the evaluation-target position on the image of the real space, which has been taken by the image pickup device 210, (namely, by displaying the guide information in the form of a superimposed image). However, the present invention is not limited that case and it may also be implemented, by way of example, as illustrated in FIGS. 9A and 9B. More specifically, as illustrated in FIG. 9A, for example, the present invention may be implemented by displaying the image of the real space, which has been taken by the image pickup device 210, in a partial region of a screen 910 of the display device 220, and by displaying the guide information, illustrated in FIG. 7, in another region 911 of the screen 910. Alternatively, as illustrated in FIG. 9B, for example, the present invention may be implemented by displaying the image of the real space, which has been taken by the image pickup device 210, in a partial region of a screen 920 of the display device 220, and by displaying the guide information, illustrated in FIG. 8, in another region 921 of the screen 920. Thus, FIGS. 9A and 9B represent the case of displaying the guide information in a region different from the image of the real space, which has been taken by the image pickup device 210, namely the case of presenting the guide information in a way not depending on the display position. As another modification, the guide information may be presented by drawing the current position and orientation of the image pickup device 210 and the evaluation-target position and orientation in the form of overhead views, two-view drawings, or three-view drawings. Moreover, the guide information may be two-dimensionally displayed over the entire screen as in the case of the guide that is given by displaying the virtual sight image V10 in a superimposed relation.

Modification 4 of First Embodiment

Modification 4 of the above first embodiment of the present invention will be described below.

The first embodiment of the present invention has been described above in connection with the case of using the method of Engel et al. in the process of calculating the position and orientation of the image pickup device 210 by the position and orientation calculation portion 120. However, a method of calculating the position and orientation by the position and orientation calculation portion 120 is not limited to that case, and any suitable method may be used insofar as the position and orientation of the image pickup device 210 can be calculated by the method.

For example, the process of calculating the position and orientation of the image pickup device 210 by the position and orientation calculation portion 120 may be performed by utilizing the so-called Visual Odometry technique that calculates change from a preceding frame by using an image without using the three dimensional map. Alternatively, the position and orientation of the image pickup device 210 may be obtained by using a sensor capable of detecting six degrees of freedom of the position and orientation of the image pickup device 210, such as an optical position and orientation sensor described in M. Bauer, M. Schlegel, D. Pustka, N. Navab, and G. Klinker, "Predicting and estimating the accuracy of n-ocular optical tracking systems," Proc. 5th IEEE and ACM International symposium on Mixed and Augmented Reality, pp. 43-51, 2006.

Furthermore, when the position and orientation of the image pickup device 210 are calculated by using the three-dimensional map as in the above-described first embodiment, a calculation method is not limited to the case of using the method of Engel et al. In the other case, the information of the three-dimensional map held in the three-dimensional map holding portion 160 and the process of updating the three-dimensional map in accordance with the processing of step S106 are also changed to be adapted for each of position and orientation calculation methods described below.

The information of the three-dimensional map is given by an assembly of key frames as described above in the first embodiment, or by the so-called global map including a three-dimensional shape or three-dimensional geometrical information in a single coordinate system. When the method utilizing the three-dimensional map given by the assembly of key frames is used, the method of calculating the position and orientation of the image pickup device 210 and the method of updating the three-dimensional map may be performed by, instead of the method described above in the first embodiment, a method of extracting feature points from an image, finding the correspondence between the key frames in the three-dimensional map and the feature points, and calculating the position and orientation, as exemplarily represented by the method of Mur-Artal et al., which is described in R. Mur-Artal, J. M. M. Montiel and J. D. Tardos, "ORB-SLAM: A Versatile and Accurate Monocular SLAM System," IEEE Transactions on Robotics, vol. 31, no. 5, pp. 1147-1163, October 2015. When the method utilizing the three-dimensional map given as the global map is used, the method of calculating the position and orientation of the image pickup device 210 may be performed by a method of holding, as the three-dimensional map, three-dimensional geometrical information in the form of a group of feature points, finding the correspondence between those feature points and feature points detected from an image, and calculating the position and orientation, as exemplarily represented by the method of Klein et al.

When the input image from the image pickup device 210 is an image from which a distance can be calculated, like a distance image, an RGBD image, or a stereo image, the position and orientation of the image pickup device 210 may be calculated by a method called Iterative Closest Point, as exemplarily represented by the method of Newcombe et al., which is described in R. A. Newcombe, S. Izadi, O. Hilliges, D. Molynewaux, D. Kim, A. J. Davison, P. Kohli, J. Shotton, S. Hodges, A. Fitzgibbon, "KinectFusion: Real-Time Dense Surface Mapping and Tracking," IEEE ISMAR 2011. In this case, the three-dimensional map is held as a three-dimensional model in the form expressing a voxel space called Truncated Signed Distance Function (TSDF).

In the information processing apparatus 100-1 according to the first embodiment (including Modification 1 through Modification 4), as described above, the image-pickup range setting portion 130 sets the image pickup range over which an image can be taken by the image pickup device 210 (S102 in FIG. 4). The position and orientation calculation portion 120 calculates the position and orientation of the image pickup device 210 by using the image taken by the image pickup device 210 (S106 in FIG. 4). The evaluation portion 140 evaluates, on the basis of the position and orientation calculated by the position and orientation calculation portion 120, the image pickup situation in the image pickup range set by the image-pickup range setting portion 130 (S107 in FIG. 4). The guide information presentation portion 150 presents, in accordance with the result of the evaluation by the evaluation portion 140, the guide information for guiding the operation of the image pickup device 210 (S108/NO in FIG. 4, S104 in FIG. 4).

With that configuration, since the guide information is presented in accordance with the evaluation result of the image pickup situation in the image pickup range over which an image can be taken by the image pickup device 210, the three-dimensional map can be created all over the range (image pickup range) that the operator operating the image pickup device 210 can experience. As a result, when the position and orientation of the image pickup device 210 are calculated by using the created three-dimensional map, accuracy and stability in the calculation can be increased.

Second Embodiment

A second embodiment of the present invention will be described below.

Figure 10:
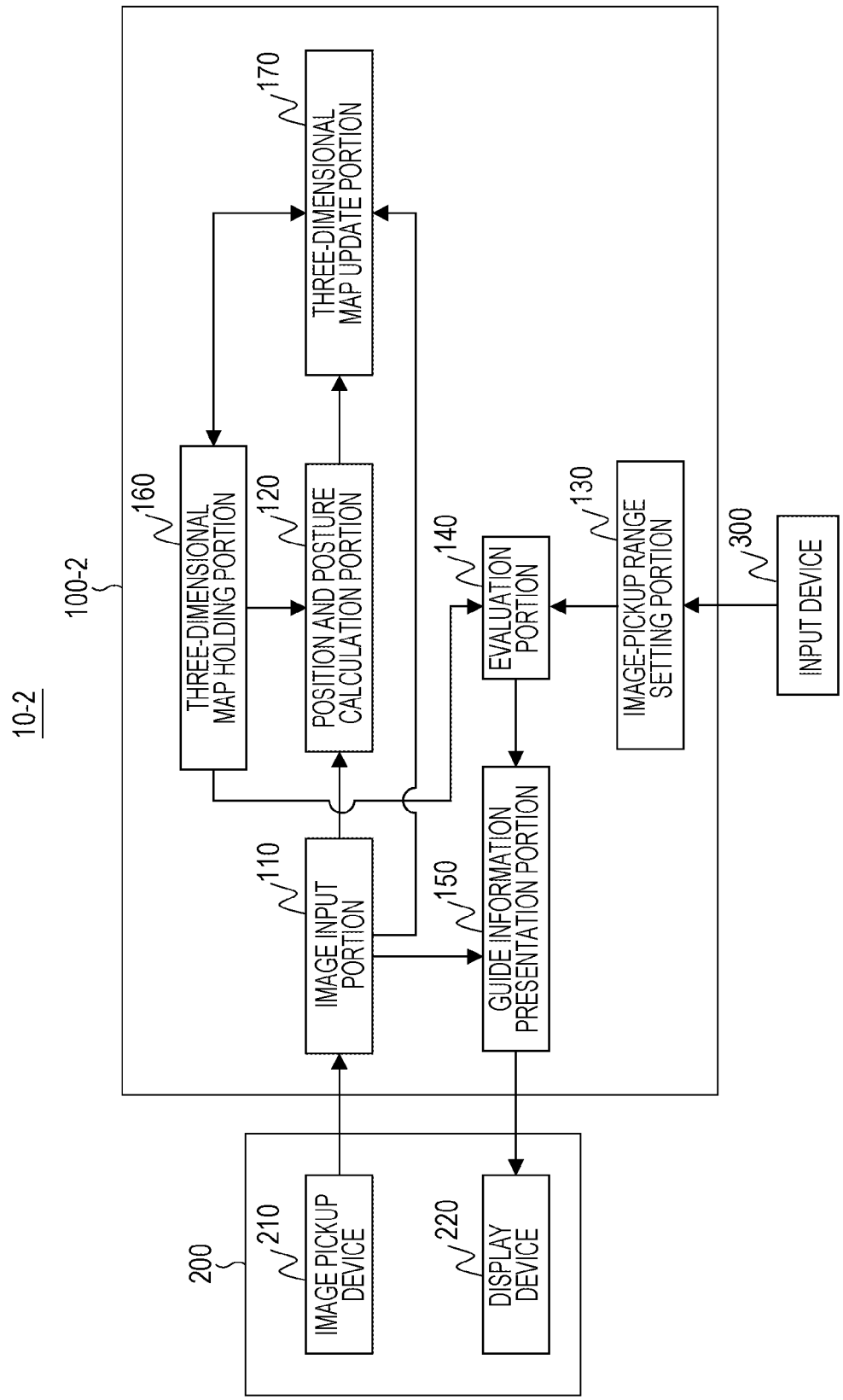
FIG. 10 is a block diagram illustrating one example of a schematic configuration of an image processing system including an information processing apparatus according to a second embodiment of the present invention.

FIG. 10 is a block diagram illustrating one example of a schematic configuration of an image processing system 10-2 including an information processing apparatus 100-2 according to the second embodiment of the present invention. In FIG. 10, similar components to those in FIG. 1 are denoted by the same reference signs, and detailed description of those components is omitted.

The image processing system 10-2 includes, as illustrated in FIG. 10, the information processing apparatus 100-2, the Head Mounted Display (HMD) 200, and the input device 300.

The information processing apparatus 100-2 executes a process of presenting information to the operator operating (for example, moving in this embodiment) the Head Mounted Display 200 that includes the image pickup device 210 and the display device 220. As illustrated in FIG. 10, the information processing apparatus 100-2 includes various functional components, i.e., the image input portion 110, the position and orientation calculation portion 120, the image-pickup range setting portion 130, the evaluation portion 140, the guide information presentation portion 150, the three-dimensional map holding portion 160, and the three-dimensional map update portion 170.

The information processing apparatus 100-2 illustrated in FIG. 10 is different from the information processing apparatus 100-1 illustrated in FIG. 1 in that the evaluation portion 140 is disconnected from the position and orientation calculation portion 120 and is connected to the three-dimensional map holding portion 160 instead. Thus, in the information processing apparatus 100-2 according to the second embodiment, the evaluation portion 140 evaluates the image pickup situation in the image pickup range, which has been set by the image-pickup range setting portion 130, by using the three-dimensional map held in the three-dimensional map holding portion 160.

A hardware configuration of the information processing apparatus 100-2 according to the second embodiment is similar to that of the information processing apparatus 100 illustrated in FIG. 2. One example of correspondence relation between the functional components of the information processing apparatus 100-2 illustrated in FIG. 10 and the hardware components of the information processing apparatus 100 illustrated in FIG. 2 is described here.

The image input portion 110, the image-pickup range setting portion 130, and the guide information presentation portion 150 illustrated in FIG. 10 are constituted, for example, by the CPU 101, the programs stored in the ROM 102, and the I/F 105 illustrated in FIG. 2. The position and orientation calculation portion 120, the evaluation portion 140, and the three-dimensional map update portion 170 illustrated in FIG. 10 are constituted, for example, by the CPU 101 and the programs stored in the ROM 102 illustrated in FIG. 2. The three-dimensional map holding portion 160 illustrated in FIG. 10 is constituted, for example, by the CPU 101, the program stored in the ROM 102, and the storage device 104 illustrated in FIG. 2.

Processing procedures in a control method executed by the information processing apparatus 100-2 according to the second embodiment are similar to those, illustrated in FIG. 4, in the control method executed by the information processing apparatus 100-1 according to the first embodiment. However, details of the process of evaluating the image pickup situation in step S107 of FIG. 4 are different from those in the control method executed by the information processing apparatus 100-1 according to the first embodiment.

More specifically, in the first embodiment, the evaluation portion 140 evaluates, in step S107 of FIG. 4, the image pickup situation in the image pickup range, set in step S102, on the basis of the position and orientation of the image pickup device 210, which have been calculated in step S106.

On the other hand, in the second embodiment, the evaluation portion 140 evaluates, in step S107 of FIG. 4, the image pickup situation in the image pickup range, set in step S102, on the basis of the three-dimensional map updated by the three-dimensional map update portion 170 in accordance with the position and orientation of the image pickup device 210, which have been calculated in step S106, and held in the three-dimensional map holding portion 160. On that occasion, the evaluation portion 140 compares the position and orientation of the key frame constituting the three-dimensional map held in the three-dimensional map holding portion 160 with the position and orientation in the evaluation-target position and orientation list, and changes the image-pickup completion flag in the evaluation-target position and orientation list to True if a difference in the position and orientation is less than a threshold.

Modification of Second Embodiment

A modification of the above second embodiment of the present invention will be described below.

Although, in the above second embodiment of the present invention, the evaluation portion 140 executes the evaluation on the basis of the difference in the position and orientation of the key frame constituting the three-dimensional map from the position and orientation in the evaluation-target position and orientation list, a method of evaluating the image pickup situation on the basis of the three-dimensional map is not limited to the above-described one. For example, in the case of projecting a key frame in the three-dimensional map to the evaluation-target position and orientation, if an image region of not less than a predetermined threshold is obtained for the key frame, the relevant position and orientation may be regarded as being already subject to image pickup, and the image-pickup completion flag for the relevant position and orientation may be changed to True.

Furthermore, in the case of holding, as the three-dimensional map, the global map as in the above-described Modification 4 of the first embodiment, an image region which is of not less than a predetermined threshold when the global map is projected to the evaluation-target position and orientation and in which map information is obtained may be regarded as being already subject to image pickup. In the case of holding the three-dimensional map in the form of a voxel space such as TSDF, the evaluation may be performed depending on whether there is a voxel with no information.

In the information processing apparatus 100-2 according to the second embodiment (including Modification), as described above, the evaluation portion 140 evaluates the image pickup situation in the image pickup range, set by the image-pickup range setting portion 130, by using the three-dimensional map that has been updated in accordance with the position and orientation calculated by the position and orientation calculation portion 120 and that is held in the three-dimensional map holding portion 160 (S107 in FIG. 4). The guide information presentation portion 150 presents, in accordance with the result of the evaluation by the evaluation portion 140, the guide information for guiding the operation of the image pickup device 210 (S108/NO in FIG. 4, S104 in FIG. 4).

With that configuration, since the image pickup situation is evaluated by using the three-dimensional map updated in accordance with the calculated position and orientation, the guide directly coupled to the three-dimensional map can be performed in addition to the advantageous effects of the first embodiment.

Third Embodiment

A third embodiment of the present invention will be described below.

In the above first and second embodiments, the guide information is presented to guide the operator to the evaluation-target position and orientation in the evaluation-target position and orientation list that has been created in step S103 of FIG. 4. However, the sets of the evaluation-target positions and orientations may include a set for which the process of calculating the position and orientation is unstable depending on ambient environments because features (geometrical features) of a taken image are deficient. In consideration of the above point, the third embodiment is described in connection with an embodiment in which the above-mentioned type of the evaluation-target position and orientation is detected and excluded from the evaluation-target position and orientation list.

Figure 11:
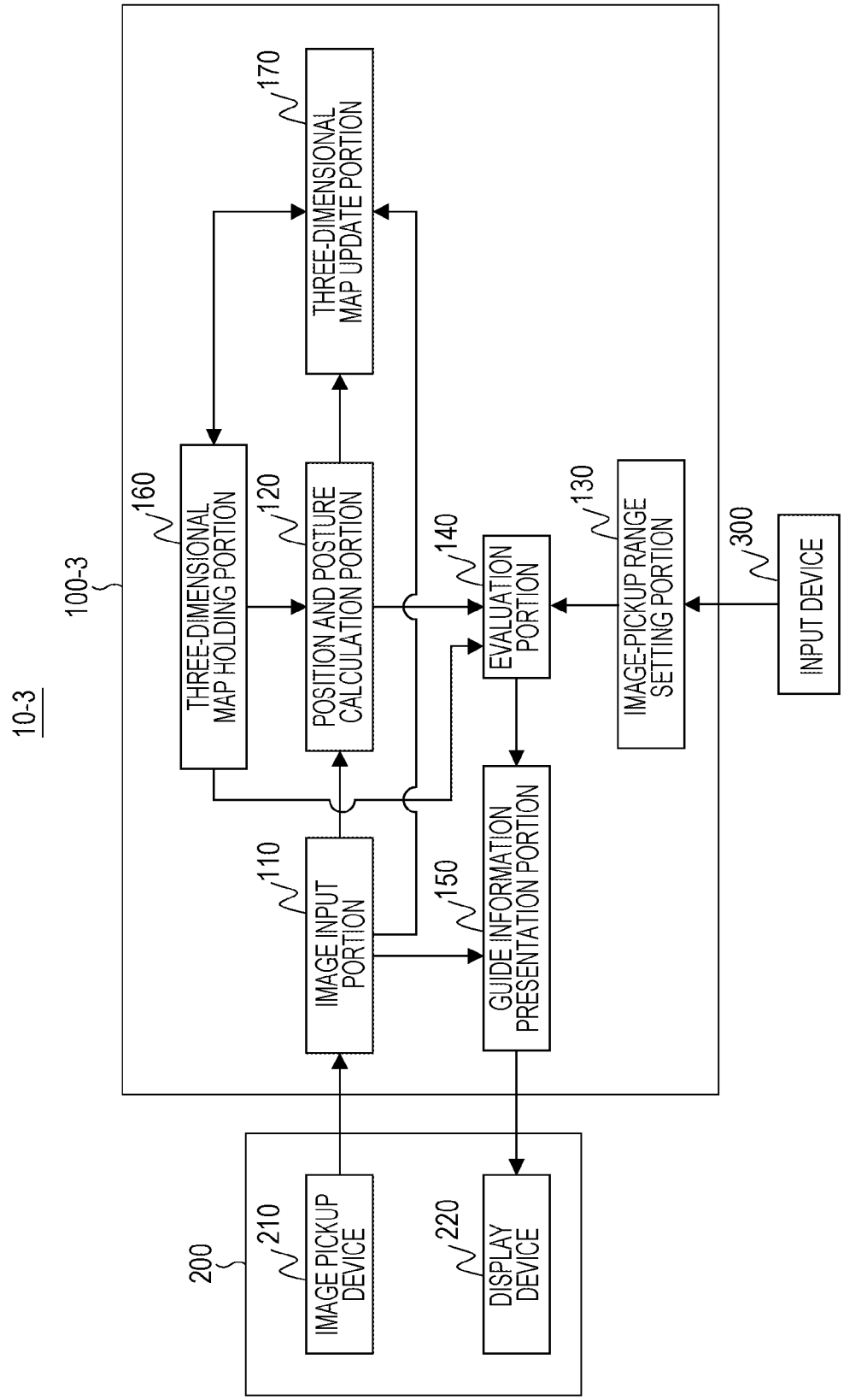
FIG. 11 is a block diagram illustrating one example of a schematic configuration of an image processing system including an information processing apparatus according to a third embodiment of the present invention.

FIG. 11 is a block diagram illustrating one example of a schematic configuration of an image processing system 10-3 including an information processing apparatus 100-3 according to a third embodiment of the present invention. In FIG. 11, similar components to those in FIG. 1 are denoted by the same reference signs, and detailed description of those components is omitted.

The image processing system 10-3 includes, as illustrated in FIG. 11, the information processing apparatus 100-3, the Head Mounted Display (HMD) 200, and the input device 300.

The information processing apparatus 100-3 executes a process of presenting information to the operator operating (for example, moving in this embodiment) the Head Mounted Display 200 that includes the image pickup device 210 and the display device 220. As illustrated in FIG. 11, the information processing apparatus 100-3 includes various functional components, i.e., the image input portion 110, the position and orientation calculation portion 120, the image-pickup range setting portion 130, the evaluation portion 140, the guide information presentation portion 150, the three-dimensional map holding portion 160, and the three-dimensional map update portion 170.

The information processing apparatus 100-3 illustrated in FIG. 11 is different from the information processing apparatus 100-1 illustrated in FIG. 1 in that the evaluation portion 140 is connected to not only the position and orientation calculation portion 120, but also to the three-dimensional map holding portion 160. Thus, in the information processing apparatus 100-3 according to the third embodiment, the evaluation portion 140 executes, in addition to the processing executed in the first embodiment, evaluation of the evaluation-target position and orientation on the basis of the three-dimensional map held in the three-dimensional map holding portion 160.

A hardware configuration of the information processing apparatus 100-3 according to the third embodiment is similar to that of the information processing apparatus 100 illustrated in FIG. 2. One example of correspondence relation between the functional components of the information processing apparatus 100-3 illustrated in FIG. 11 and the hardware components of the information processing apparatus 100 illustrated in FIG. 2 is described here.

The image input portion 110, the image-pickup range setting portion 130, and the guide information presentation portion 150 illustrated in FIG. 11 are constituted, for example, by the CPU 101, the programs stored in the ROM 102, and the I/F 105 illustrated in FIG. 2. The position and orientation calculation portion 120, the evaluation portion 140, and the three-dimensional map update portion 170 illustrated in FIG. 11 are constituted, for example, by the CPU 101 and the programs stored in the ROM 102 illustrated in FIG. 2. The three-dimensional map holding portion 160 illustrated in FIG. 11 is constituted, for example, by the CPU 101, the program stored in the ROM 102, and the storage device 104 illustrated in FIG. 2.

Processing procedures in a control method executed by the information processing apparatus 100-3 illustrated in FIG. 11 will be described below.

Figure 12:
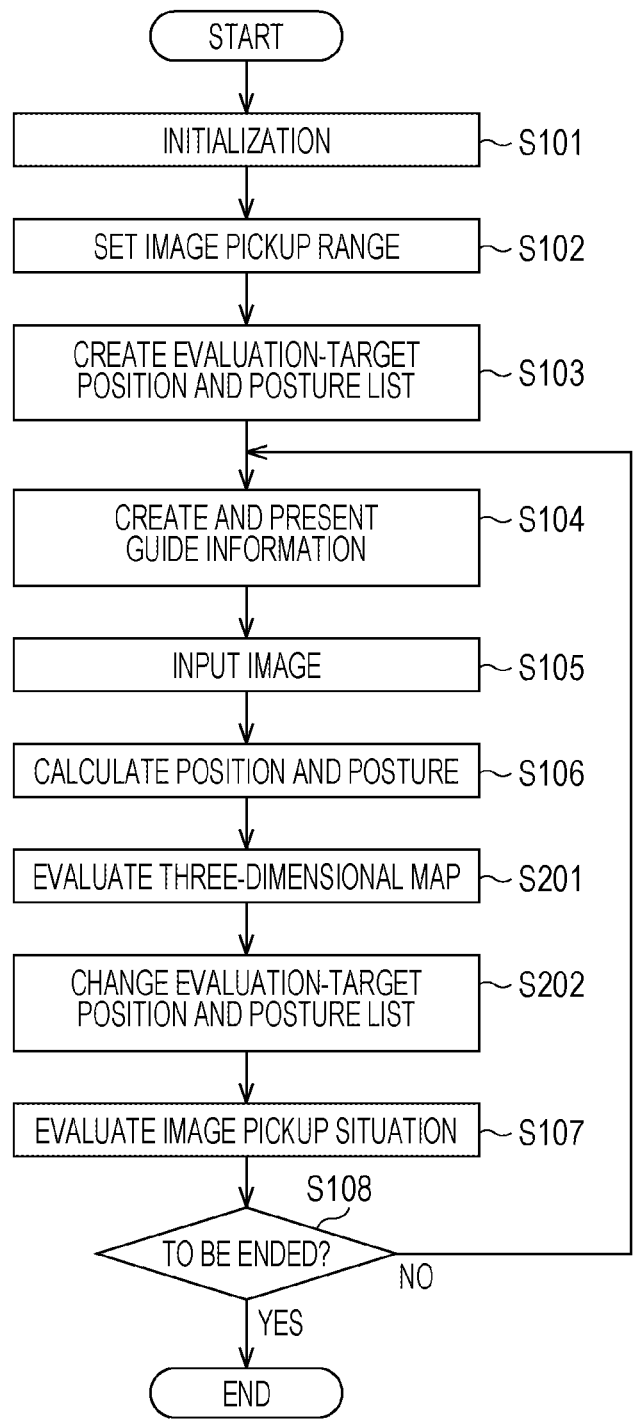
FIG. 12 is a flowchart illustrating one example of processing procedures in a control method for the information processing apparatus according to the third embodiment of the present invention.

FIG. 12 is a flowchart illustrating one example of the processing procedures in the control method for the information processing apparatus 100-3 according to the third embodiment of the present invention. In FIG. 12, processing steps similar to those in the control method executed by the information processing apparatus 100-1 according to the first embodiment illustrated in FIG. 4 are denoted by the same step numbers, and detailed description of those steps is omitted.

In the processing procedures in the control method for the information processing apparatus 100-3 according to the third embodiment, the processing of step S101 to step S106 illustrated in FIG. 4 is first executed.

Then, in step S201 of FIG. 12, the evaluation portion 140 evaluates the evaluation-target position and orientation in the current evaluation-target position and orientation list on the basis of the three-dimensional map held in the three-dimensional map holding portion 160.

Then, in step S202, the evaluation portion 140 executes a process of changing the evaluation-target position and orientation list in accordance with the result of the evaluation in step S201. For example, the evaluation portion 140 changes the image-pickup completion flag to True for the evaluation-target position and orientation that have been evaluated to be not suitable for use in the guide as the result of the evaluation in step S201, and excludes the relevant evaluation-target position and orientation from the target that is to be presented as the guide information. Although the description is made here in connection with an example of changing the image-pickup completion flag and excluding the relevant evaluation-target position and orientation, this embodiment is not limited to that case. For example, the evaluation-target position and orientation list may include a flag dedicated for the above-described exclusion. As an alternative, the relevant evaluation-target position and orientation may be excluded by using, instead of only two values of True and False as the image-pickup completion flag, three values indicating completion of the image pickup, incompletion of the image pickup, and exclusion from the guide.

Here, detailed processing procedures in step S202 of FIG. 12 is described.

Figure 13:
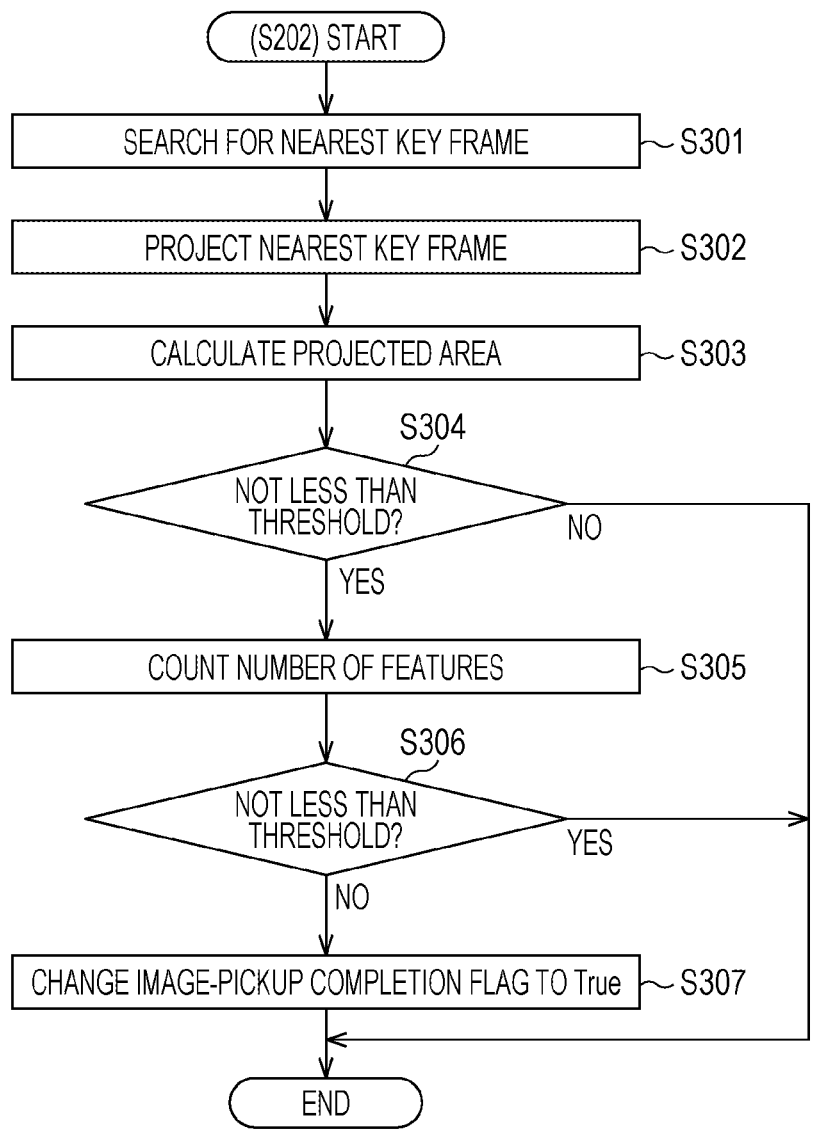
FIG. 13 is a flowchart illustrating one example of detailed processing procedures in step S202 of FIG. 12.

FIG. 13 is a flowchart illustrating one example of the detailed processing procedures in step S202 of FIG. 12.

First, in step S301 of FIG. 13, the evaluation portion 140 searches for one (nearest key frame) among the key frames held in the three-dimensional map, the one having the position and orientation closest to certain one set of the position and orientation in the evaluation-target position and orientation list.

Then, in step S302, the evaluation portion 140 projects the key frame (nearest key frame), which has been searched in step S301, to the evaluation-target position and orientation.

Then, in step S303, the evaluation portion 140 calculates a projected area (image area) when the key frame has been projected in step S302.

Then, in step S304, the evaluation portion 140 determines whether the projected area calculated in step S303 is not less than a threshold. If a result of the determination shows that the projected area is not more than the threshold (namely, the projected area is less than the threshold) (S304/NO), this implies that there are no key frames nearby, and that whether the features (geometrical features) are sufficient cannot be determined at the current moment. Therefore, the processing of the flowchart illustrated in FIG. 13 is ended.

On the other hand, if the result of the determination in step S304 shows that the projected area not less than the threshold (S304/YES), the procedure goes to step S305.

In step S305, the evaluation portion 140 counts the number of features (geometrical features) present on the image among the features (geometrical features) of the key frame that has been projected in step S302.

Then, in step S306, the evaluation portion 140 determines whether the number of the features counted in step S305 is not less than a threshold. If a result of the determination shows that the number of the features counted in step S305 is not less than the threshold (S306/YES), the processing of the flowchart illustrated in FIG. 13 is ended upon judgement that the sufficient number of the features (geometrical features) is present in the relevant region.

On the other hand, if the result of the determination in step S306 shows that the number of the features counted in step S305 is not more than the threshold (namely, if the number of the features is less than the threshold) (S306/NO), the procedure goes to step S307 upon judgement that the number of the features (geometrical features) is insufficient in the relevant region.

In step S307, the evaluation portion 140 changes the image-pickup completion flag to True for the relevant set of the position and orientation in the evaluation-target position and orientation list. After the end of the processing of step S307, the processing of the flowchart illustrated in FIG. 13 is ended.

When there are plural sets of the evaluation-target positions and orientations in the evaluation-target position and orientation list, the processing of the flowchart illustrated in FIG. 13 is executed for each set of the evaluation-target position and orientation.

Modification of Third Embodiment

Although the above third embodiment of the present invention has been described in connection with the case of avoiding the presentation of the guide information to the region where the number of the features (geometrical features) is insufficient, the present invention is not limited to that case. For example, the present invention can also be implemented, as a modification of the third embodiment, in the form of avoiding the presentation of the guide information to the region for which it is determined that the operator cannot physically reach there (namely, the image pickup device 210 cannot be physically arranged there).

Among the methods, described above in Modification 4 of the first embodiment, of holding the three-dimensional map as the global map, in the method of holding a three-dimensional model as the map, for example, because the model can hold a plane, it is possible to determine whether the operator can physically reach the evaluation-target position and orientation. In this case, for example, the evaluation portion 140 executes collision determination at a position included in the model or in a route along which the operator operating the image pickup device 210 moves toward the evaluation-target position and orientation, and determines that the operator is difficult to move at the position where collision occurs. Then, the evaluation portion 140 excludes that position from the evaluation-target position and orientation.

In the information processing apparatus 100-3 according to the third embodiment (including Modification), as described above, the evaluation portion 140 evaluates the evaluation-target position and orientation by using the three-dimensional map held in the three-dimensional map holding portion 160 (S201 in FIG. 12), and updates the evaluation-target position and orientation list in accordance with the result of the evaluation (S202 in FIG. 12). More specifically, the evaluation portion 140 excludes the evaluation-target position and orientation, which has been evaluated to be not suitable for use in the guide, from the target presented as the guide information.

With that configuration, since the evaluation-target position and orientation, which has been evaluated to be not suitable for use in the guide, excluded from the target presented as the guide information, the guide to the region where the process of calculating the position and orientation of the image pickup device 210 becomes unstable can be avoided in addition to the advantageous effects of the first embodiment.

Although the above third embodiment (including Modification) has been described about different points from the above first embodiment on which the third embodiment is based, the present invention is not limited to that case. The present invention can be further implemented in the form adopting the above second embodiment as a basis and applying the third embodiment (including Modification) to different points from the second embodiment.

Fourth Embodiment

A fourth embodiment of the present invention will be described below.

The above third embodiment is intended to avoid the guide to the region where the process of calculating the position and orientation becomes unstable even in the set image pickup region for the reason, for example, that the number of the features (geometrical features) is insufficient. The fourth embodiment is intended to construct an ambient environment in which the process of calculating the position and orientation can be stably executed in the set image pickup region, by presenting, to the operator, the above-mentioned region as a region to which features (geometrical features) are to be added.

Figure 14:
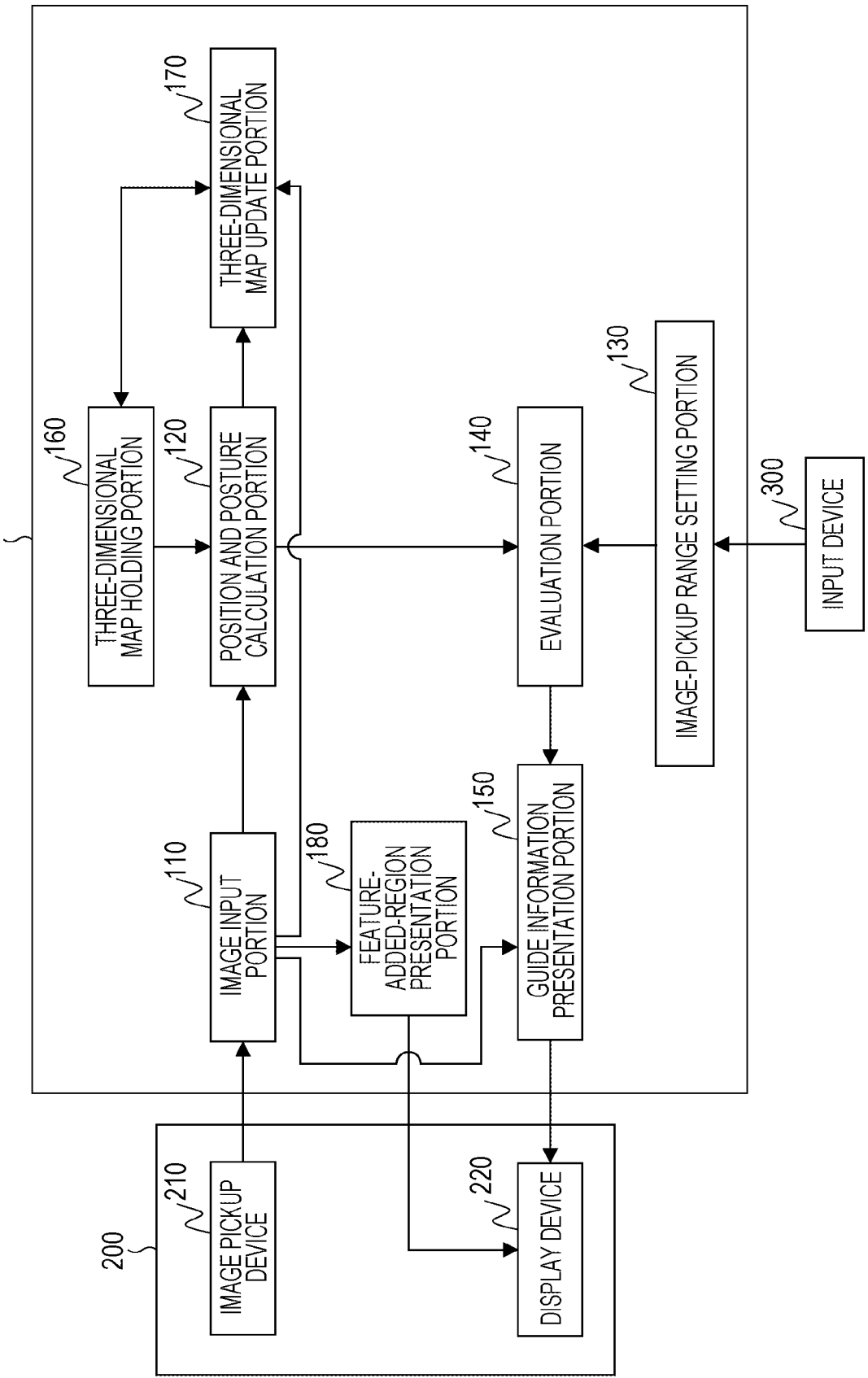
FIG. 14 is a block diagram illustrating one example of a schematic configuration of an image processing system including an information processing apparatus according to a fourth embodiment of the present invention.

FIG. 14 is a block diagram illustrating one example of a schematic configuration of an image processing system 10-4 including an information processing apparatus 100-4 according to the fourth embodiment of the present invention. In FIG. 14, similar components to those in FIG. 1 are denoted by the same reference signs, and detailed description of those components is omitted.

The image processing system 10-4 includes, as illustrated in FIG. 14, the information processing apparatus 100-4, the Head Mounted Display (HMD) 200, and the input device 300.

The information processing apparatus 100-4 executes a process of presenting information to the operator operating (for example, moving in this embodiment) the Head Mounted Display 200 that includes the image pickup device 210 and the display device 220. As illustrated in FIG. 14, the information processing apparatus 100-4 includes various functional components, i.e., the image input portion 110, the position and orientation calculation portion 120, the image-pickup range setting portion 130, the evaluation portion 140, the guide information presentation portion 150, the three-dimensional map holding portion 160, the three-dimensional map update portion 170, and a feature-added-region presentation portion 180. The information processing apparatus 100-4 illustrated in FIG. 14 is different from the information processing apparatus 100-1 illustrated in FIG. 1 in that the feature-added-region presentation portion 180 is added.

The feature-added-region presentation portion 180 determines, by using the image (taken image) input from the image input portion 110, the region where the process of calculating the position and orientation becomes unstable because the number of the features (geometrical features) is insufficient, and presents the unstable region as a feature added region on the display device 220.

A hardware configuration of the information processing apparatus 100-4 according to the fourth embodiment is similar to that of the information processing apparatus 100 illustrated in FIG. 2. One example of correspondence relation between the functional components of the information processing apparatus 100-4 illustrated in FIG. 14 and the hardware components of the information processing apparatus 100 illustrated in FIG. 2 is described here.

The image input portion 110, the image-pickup range setting portion 130, the guide information presentation portion 150, and the feature-added-region presentation portion 180 illustrated in FIG. 14 are constituted, for example, by the CPU 101, the programs stored in the ROM 102, and the I/F 105 illustrated in FIG. 2. The position and orientation calculation portion 120, the evaluation portion 140, and the three-dimensional map update portion 170 illustrated in FIG. 14 are constituted, for example, by the CPU 101 and the programs stored in the ROM 102 illustrated in FIG. 2. The three-dimensional map holding portion 160 illustrated in FIG. 14 is constituted, for example, by the CPU 101, the program stored in the ROM 102, and the storage device 104 illustrated in FIG. 2.

Processing procedures in a control method executed by the information processing apparatus 100-4 illustrated in FIG. 14 will be described below.

Figure 15:
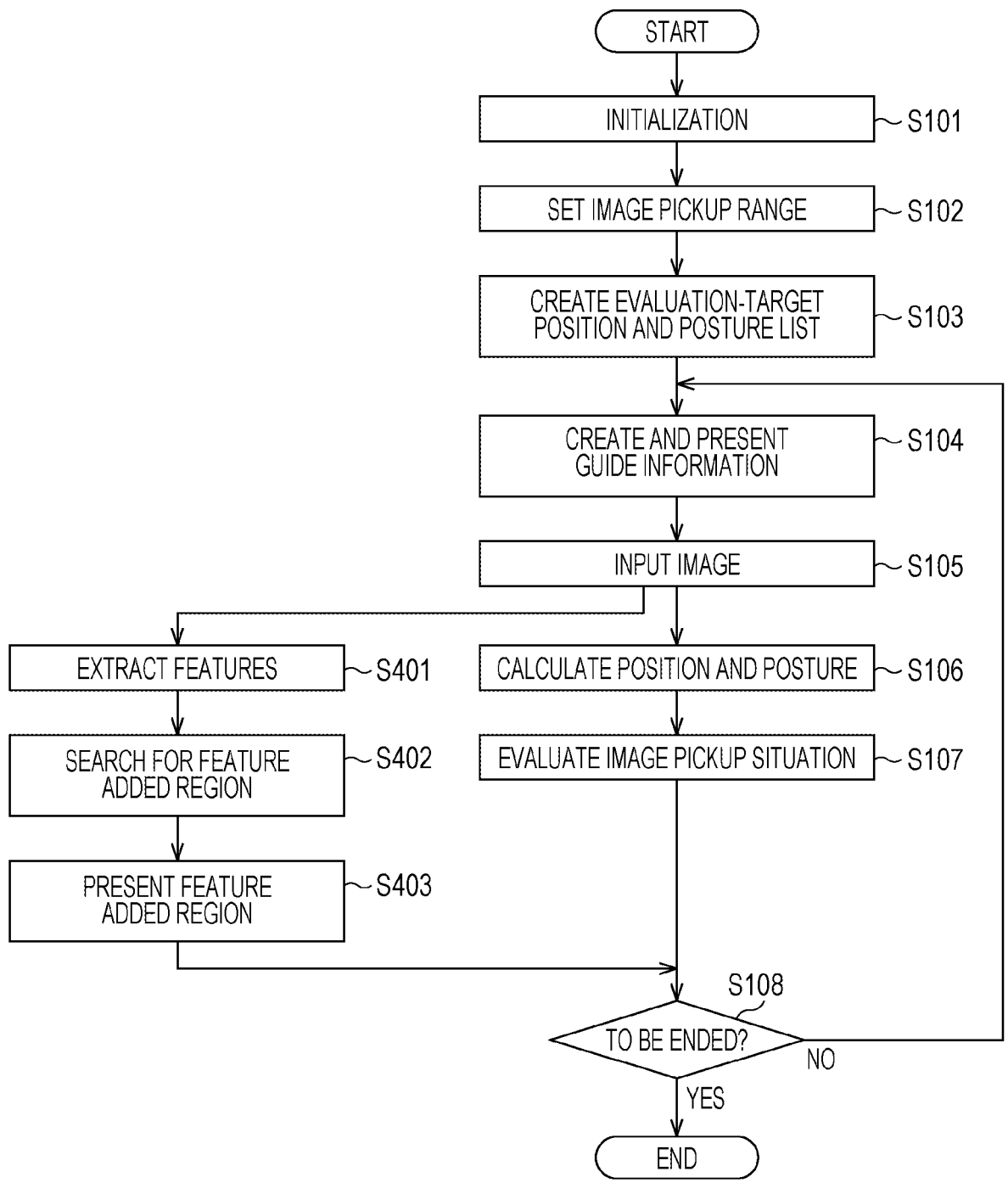
FIG. 15 is a flowchart illustrating one example of processing procedures in a control method for the information processing apparatus according to the fourth embodiment of the present invention.

FIG. 15 is a flowchart illustrating one example of the processing procedures in the control method for the information processing apparatus 100-4 according to the fourth embodiment of the present invention. In FIG. 15, processing steps similar to those in the control method executed by the information processing apparatus 100-1 according to the first embodiment illustrated in FIG. 4 are denoted by the same step numbers, and detailed description of those steps is omitted.

In the processing procedures in the control method for the information processing apparatus 100-4 according to the fourth embodiment, the processing of step S101 to step S108 illustrated in FIG. 4 is first executed as illustrated in FIG. 15. On that occasion, in the processing procedures in the control method for the information processing apparatus 100-4 according to the fourth embodiment, processing of step S401 to step S403 illustrated in FIG. 15 is executed during a period from the processing of step S105 to the processing of step S108. The processing of step S401 to step S403 may be executed in parallel to the processing of step S106 to step S107 or in the middle of that processing. An example illustrated in FIG. 15 represents the case of executing the above-mentioned steps in parallel.

When an image taken by the image pickup device 210 is input from the image input portion 110 in step S105 of FIG. 15, the feature-added-region presentation portion 180 extracts features (geometrical features), which are used in a process of calculating the position and orientation of the image pickup device 210, from the input image in step S401.

Then, in step S402, the feature-added-region presentation portion 180 executes a process of searching for the feature added region from the image (taken image) input in step S105.

Figure 16A:
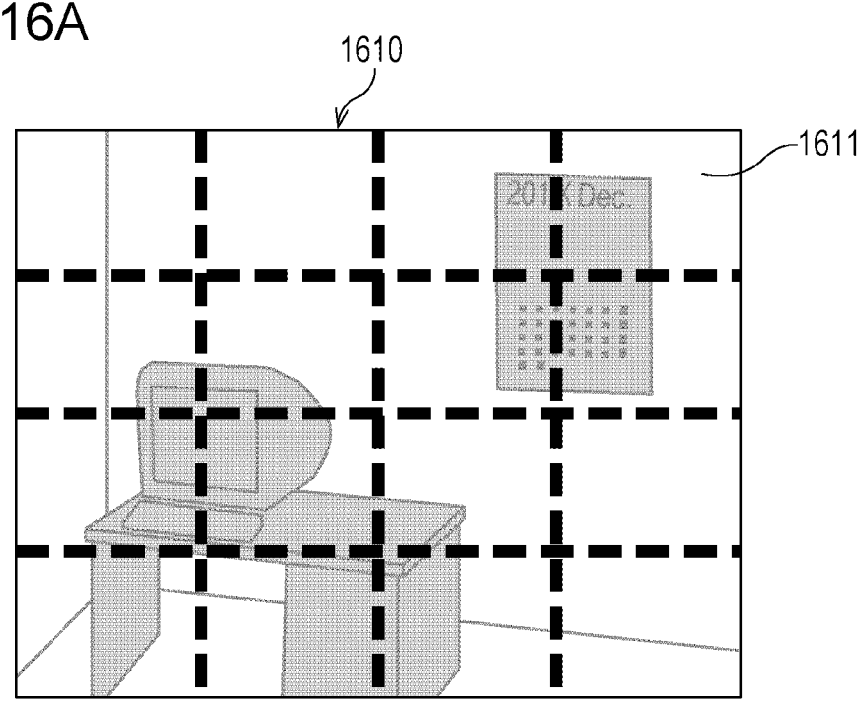
FIG. 16A is an explanatory view referenced to explain processing in step S402 of FIG. 15.
Figure 16B:
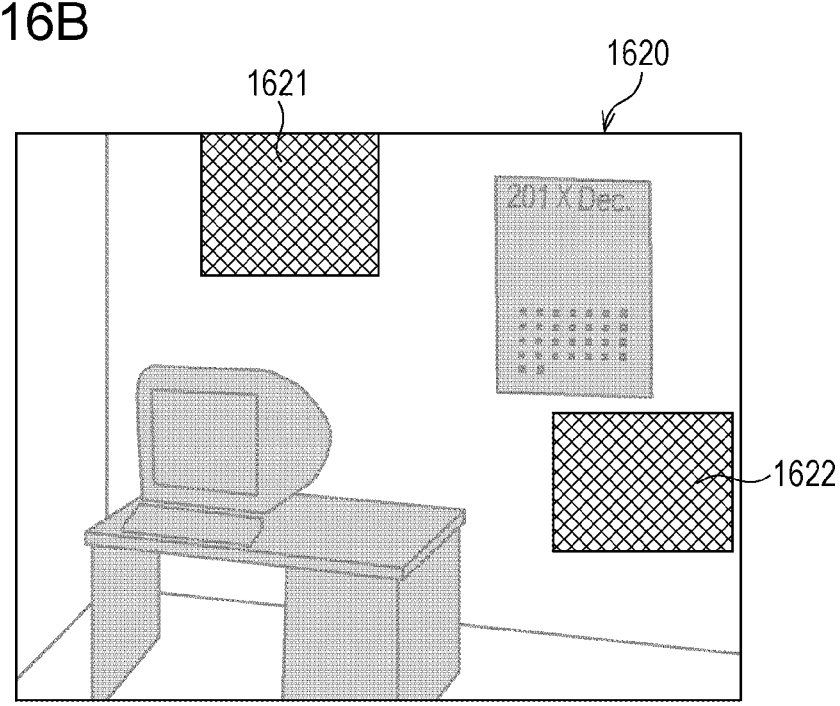
FIG. 16B is an explanatory view referenced to explain processing in step S403 of FIG. 15.

FIGS. 16A and 16B are explanatory views referenced to explain processing in steps S402 and S403 of FIG. 15, respectively.

More specifically, in step S402, the feature-added-region presentation portion 180 divides a taken image 1610, illustrated in FIG. 16A, into a plurality of regions 1611, and determines for each of the divided regions 1611 whether the number of the features (geometrical features) extracted in step S401 is not less than the threshold. Then, the feature-added-region presentation portion 180 determines, as the feature added region, the divided region 1611 for which it has been determined that the number of the features (geometrical features) is less than the threshold.

Now, return to the description of FIG. 15 again.

After the end of the processing in step S402, the procedure goes to step S403.

In step S403, the feature-added-region presentation portion 180 presents the feature added region, searched in step S402, on the display device 220.

More specifically, as illustrated in FIG. 16B, the feature-added-region presentation portion 180 presents a presentation image 1620 on the display device 220 in step S403, the presentation image 1620 indicating the feature added regions 1621 and 1622 on the taken image 1610 illustrated in FIG. 16A. Although FIG. 16B illustrates an example in which the presentation image 1620 indicating only the feature added regions 1621 and 1622 is presented on the taken image 1610, this embodiment is not limited to that case. In another example, this embodiment may be implemented in the form of presenting a presentation image indicating one or more feature added regions and the guide information on the taken image with cooperation of the feature-added-region presentation portion 180 and the guide information presentation portion 150.

Modification of Fourth Embodiment

A modification of the above fourth embodiment of the present invention will be described below.

Although the above fourth embodiment of the present invention has been described as executing the process of determining the feature added region in accordance with the number of the features (geometrical features) for each of the divided regions of the taken image, the present invention is not limited that case, and any suitable method may be used insofar as the method can determine the region to which features are to be added. For example, the feature added region may be determined to make a distribution of features uniform as with the Zhang's method, or to spread the distribution. A method of presenting the feature added region is also not limited to the method of displaying the feature added region in the form of a rectangular region like the feature added reunions 1621 and 1622 illustrated in FIG. 16B. In another example, a figure, such as a star or a pin, may be displayed at the center of the feature added region insofar as the operator can recognize the feature added region.

In the information processing apparatus 100-4 according to the fourth embodiment (including Modification), as described above, the feature-added-region presentation portion 180 determines the region where the process of calculating the position and orientation becomes unstable because the number of the features (geometrical features) is insufficient, and presents the unstable region as the feature added region on the display device 220 (S401 to S403 in FIG. 15).

With that configuration, since the region where the number of the features (geometrical features) is insufficient is presented, the region where the process of calculating the position and orientation of the image pickup device 210 becomes unstable can be notified to the operator in addition to the advantageous effects of the first embodiment. Thus, for example, with the operator performing an operation of adding features (geometrical features) to the feature added region that has been presented, accuracy and stability in the calculation of the position and orientation of the image pickup device 210 can be increased in the relevant region.

Although the above fourth embodiment (including Modification) has been described about different points from the above first embodiment on which the fourth embodiment is based, the present invention is not limited to that case. The present invention can be further implemented in the form adopting the above second embodiment or the third embodiment as a basis and applying the fourth embodiment (including Modification) to different points from the second or third embodiment.

Other Embodiments

The image pickup device 210 in the present invention may be any type of image pickup device insofar as the image pickup device can take an image of the real space. For example, the image pickup device 210 may be a camera taking a grayscale image, a camera taking a color image, a depth camera taking a distance image, or an RGBD camera taking a color image and a distance image at the same time. Moreover, the image pickup device 210 may be a single device or may be constituted by a plurality of cameras, such as a set of stereo cameras.

The position and orientation calculation portion 120 in the present invention may be of any suitable type insofar as it can calculate the position and orientation of the image pickup device 210. For example, the position and orientation calculation portion 120 may calculate, on the basis of the three-dimensional map, the position and orientation of the image pickup device 210 by using, as a feature point, a point at which the gradient of a luminance value is large, or may calculate the position and orientation of the image pickup device 210 by explicitly detecting the feature point, and by finding the correspondence between the feature point and the three-dimensional map. As an alternative, the position and orientation calculation portion 120 may obtain a value from a magnetic sensor, for example, which can determine the position and orientation of the image pickup device 210.

The evaluation portion 140 in the present invention may be of any suitable type insofar as it can evaluate the image pickup situation in the image pickup range set by the image-pickup range setting portion 130. For example, the evaluation portion 140 may create a list including discrete evaluation-target positions and orientations, determine that the image pickup has been completed when a difference from the position and orientation calculated by the position and orientation calculation portion 120 is not more than a threshold, and evaluate whether the image pickup has been completed for all the evaluation-target position and orientations in the list. In another example, the evaluation portion 140 may execute the evaluation on the basis of a difference relative to the position and orientation of the key frame in the three-dimensional map.

The guide information presentation portion 150 in the present invention may be of any suitable type insofar as it can present the evaluation-target position and orientation to the operator. For example, the guide information presentation portion 150 may display objects indicating discrete evaluation-target positions and orientations in the virtual space, or may display a direction of change (movement) up to the evaluation-target position and orientation by using an object such as an arrow, for example.

The present invention can also be implemented by supplying a program, which realizes one or more functions of the above embodiment, to a system or a device via a network or a storage medium, and by operating one or more processors, which are incorporated in a computer in the system or the device, so as to perform a process of reading and executing the program. Furthermore, the present invention can be implemented by using a circuit (e.g., ASIC) that realizes the one or more functions.

According to the present invention, the operator operating the image pickup device can be guided to take an image at any places over the range that the operator can experience. Therefore, the three-dimensional map can be created all over that range. In addition, when the position and orientation of the image pickup device are calculated by using the created three-dimensional map, accuracy and stability in the calculation can be increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus presenting information to an operator who operates an image pickup device, the information processing apparatus comprising:
   a setting unit configured to set an image pickup range over which an image can be taken by the image pickup device;
   a calculation unit configured to calculate a position and orientation of the image pickup device by using the image taken by the image pickup device;
   a evaluation unit configured to evaluate an image pickup situation in the image pickup range on the basis of the position and orientation calculated by the calculation unit; and
   a information presentation unit configured to present, in accordance with evaluation by the evaluation means, guide information for guiding an operation of the image pickup device.

2. The information processing apparatus according to claim 1, wherein the evaluation unit determines evaluation-target position and orientation of the image pickup device on the basis of the image pickup range set by the setting unit, and evaluates the image pickup situation on the basis of the evaluation-target position and orientation and the position and orientation calculated by the calculation unit.

3. The information processing apparatus according to claim 2, wherein the information presentation unit presents, as the guide information, an object indicating at one set of the position and orientation among the evaluation-target positions and orientations determined by the evaluation unit.

4. The information processing apparatus according to claim 3, wherein the information presentation unit displays, in a recognizable display form, the object that is presented as the guide information.

5. The information processing apparatus according to claim 3, wherein the information presentation unit presents, as the guide information, an object indicating a reference body and an index indicating a state in which an image of the reference body is to be taken.

6. The information processing apparatus according to claim 2, wherein the information presentation unit presents, as the guide information, an object indicating a direction of change up to one set of the evaluation-target position and orientation determined by the evaluation unit.

7. The information processing apparatus according to claim 6, wherein the information presentation unit presents one or more arrows as the objects each indicating the direction of the change.

8. The information processing apparatus according to any one of claim 2, wherein the evaluation unit evaluates the image pickup situation depending on whether a difference between the determined evaluation-target position and orientation and the position and orientation calculated by the calculation unit is not more than a threshold.

9. The information processing apparatus according to claim 1, further comprising holding unit holding a three-dimensional map with respect to geometrical features of the image pickup range,
   wherein the calculation unit calculates the position and orientation of the image pickup device by using the image taken by the image pickup device and the three-dimensional map held by the holding unit.

10. The information processing apparatus according to claim 9, further comprising update unit updating the three-dimensional map held by the holding unit in accordance with the image taken by the image pickup device and the position and orientation calculated by the calculation unit,
    wherein the evaluation unit evaluates the image pickup situation by using the three-dimensional map held by the holding unit.

11. The information processing apparatus according to claim 9, wherein the evaluation unit determines the evaluation-target position and orientation of the image pickup device on the basis of the image pickup range set by the setting unit, changes the determined evaluation-target position and orientation by using the three-dimensional map held by the holding unit, and evaluates the image pickup situation on the basis of the updated evaluation-target position and orientation and the position and orientation calculated by the calculation unit.

12. The information processing apparatus according to claim 11, wherein, in changing the determined evaluation-target position and orientation, the evaluation unit excludes, from among the determined evaluation-target positions and orientations, the position and orientation to which the image pickup device cannot be physically arranged.

13. The information processing apparatus according to claim 11, wherein, in changing the determined evaluation-target position and orientation, the evaluation unit excludes, from among the determined evaluation-target positions and orientations, the position and orientation in a region in which the number of the geometrical features is less than a threshold.

14. The information processing apparatus according to any one of claim 1, wherein the information presentation unit presents the guide information by displaying the guide information on a display device that the operator views.

15. The information processing apparatus according to claim 14, wherein the information presentation unit displays the guide information in a superimposed relation to the image displayed on the display device.

16. The information processing apparatus according to claim 14, wherein the information presentation unit displays the guide information in a region different from the image displayed on the display device.

17. The information processing apparatus according to any one of claim 14, wherein the information presentation unit further displays, on the display device, progress rate information indicating a rate of the positions and orientations at which image pickup has been made by the image pickup device, among the evaluation-target positions and orientations of the image pickup device determined on the basis of the image pickup range.

18. The information processing apparatus according to any one of claim 1, further comprising region presentation unit presenting, among regions of the image taken by the image pickup device, each region in which the number of geometrical features is less than a threshold.

19. A control method for an information processing apparatus presenting information to an operator who operates an image pickup device, the control method comprising:

a setting step of setting an image pickup range over which an image can be taken by the image pickup device;

a calculation step of calculating a position and orientation of the image pickup device by using the image taken by the image pickup device;

an evaluation step of evaluating an image pickup situation in the image pickup range on the basis of the position and orientation calculated in the calculation step; and an information presentation step of presenting, in accordance with evaluation in the evaluation step, guide information for guiding an operation of the image pickup device.

20. A non-transitory computer-readable storage medium storing a computer program causing a computer to function as:

a setting unit configured to set an image pickup range over which an image can be taken by the image pickup device;

a calculation unit configured to calculate a position and orientation of the image pickup device by using the image taken by the image pickup device;

a evaluation unit configured to evaluate an image pickup situation in the image pickup range on the basis of the position and orientation calculated by the calculation unit; and an information presentation unit configured to present, in accordance with evaluation by the evaluation unit, guide information for guiding an operation of the image pickup device.

\* \* \* \* \*